United States Patent [19]
Friedmann

[11] Patent Number: 5,822,362
[45] Date of Patent: Oct. 13, 1998

[54] SINUSOIDAL PHASE MODULATION METHOD AND SYSTEM

[75] Inventor: James J. Friedmann, Canton, Ohio

[73] Assignee: Aironet Wireless Communications, Inc., Fairlawn, Ohio

[21] Appl. No.: 616,254

[22] Filed: Mar. 15, 1996

[51] Int. Cl.⁶ .................................................. H04B 15/00
[52] U.S. Cl. .......................... 375/200; 375/200; 375/202; 375/308; 370/206; 370/209; 455/420; 455/522
[58] Field of Search .................................... 375/200, 206, 375/208, 308, 344, 348, 376, 336, 328, 202; 332/103; 380/34; 370/206, 209; 342/457, 463; 455/420, 522

[56] References Cited

U.S. PATENT DOCUMENTS

| | | | |
|---|---|---|---|
| 4,653,068 | 3/1987 | Kadin et al. | 375/1 |
| 4,680,777 | 7/1987 | Saha et al. | 375/53 |
| 4,726,039 | 2/1988 | Piesinger et al. | 375/67 |
| 4,748,641 | 5/1988 | Dapper. | |
| 5,175,514 | 12/1992 | Iinuma et al.. | |
| 5,225,795 | 7/1993 | Iinuma. | |
| 5,446,760 | 8/1995 | Bienz et al.. | |
| 5,499,266 | 3/1996 | Yokev et al. | 375/202 |
| 5,610,940 | 3/1997 | Durrant et al. | 375/208 |

*Primary Examiner*—Stephen Chin
*Assistant Examiner*—Shuwang Liu
*Attorney, Agent, or Firm*—Renner, Otto, Boisselle & Sklar, P.P.L.

[57] ABSTRACT

A system which phase modulates a carrier to produce a carrier signal which transitions in phase between predetermined phase states as a function of the data, wherein a rate at which the carrier signal changes phase during a transition between the predetermined phase states varies substantially sinusoidally. The phase modulation provides a constant amplitude modulated waveform having low side lobes. Such modulation method preserves the high noise tolerance capabilities associated with FH systems and the high data throughput capabilities of DS systems.

28 Claims, 14 Drawing Sheets

SINUSOIDAL PHASE MODULATION METHOD AND SYSTEM

TECHNICAL FIELD

The present invention relates generally to a sinusoidal phase modulation (SPM) technique, and more particularly to a hybrid communication system employing the same.

BACKGROUND OF THE INVENTION

In recent years, the use of cellular communication systems having mobile terminals which communicate with a hardwired network, such as a local area network (LAN) or a wide area network (WAN), has become widespread. Retail stores and warehouses, for example, may use a cellular communication system to track inventory and replenish stock. At loading docks and other large outdoor storage facilities, such systems are used to keep an accurate account of incoming and outgoing shipments. In manufacturing facilities, such systems are useful for tracking parts, completed products and defects.

A typical cellular communication system includes a number of fixed location base stations interconnected by a cable medium to form a hardwired network. The hardwired network is often referred to as a system backbone. Also included in many cellular communication systems are intermediate base stations which are not directly connected to the hardwired network. Intermediate base stations, often referred to as wireless base stations, increase the area within which base stations connected to the hardwired network can communicate with mobile terminals. The term "base station" will hereinafter refer both to base stations hardwired to the network and wireless base stations unless otherwise indicated.

Wireless communication systems such as those described above often involve spread spectrum (SS) technology. A SS communication system is one in which the transmitted frequency spectrum or bandwidth is much wider than absolutely necessary. Generally SS technology is used by those who wish to communicate in the unlicensed bands provided by the FCC. These bands include the 902–928 MHZ and 2.4–2.48 GHz ranges. The FCC requires that information transmitted in these bands be spread and coded in order to allow for multiple user access.

The two most popular spreading methods in spread spectrum systems are referred to as frequency hopping (FH) and direct sequence (DS) spreading. In FH systems, the radio transmitter hops from one carrier frequency channel to another at a specific hopping rate and in a specific sequence that appears to be a random pattern. This pattern is often referred to as a pseudo-random hop sequence. FH systems offer the advantage of high noise avoidance due to the continuous hopping among different frequencies, otherwise referred to as frequency channels. For instance, a noise signal associated with a particular frequency will interfere with a FH modulated waveform only when the FH modulated waveform is sent on a channel which encompasses the frequency of the noise. Since FH systems will typically hop through a large number of channels (e.g., 75 or more), the noise interference will be limited to only one of every 75 or more hops.

A drawback of FH systems relates to the bandwidth limitation of each channel. Because of the large number of channels typically associated with FH systems and the limited amount of overall bandwidth available, the available bandwidth for each particular channel (i.e., the channel spacing) is relatively narrow. Transmissions on each channel must utilize an even narrower bandwidth in order to avoid crossing over into adjacent channels. Thus, typically, there are strict regulations on the maximum out of band energy (usually associated with side lobes) permitted for FH transmissions. For example, in the 902 MHZ and 2.4 GHz bands the Federal Communications Commission (FCC) requires that any side lobes which may cross over into adjacent channels be at least 20 decibels (db) below the level of the main lobe.

Direct sequence (DS) systems differ from FH systems in that they do not hop among different frequency channels. Rather, DS systems broaden the overall bandwidth of their transmissions by artificially increasing the data bit rate. More specifically, direct sequence transmissions involve dividing each data bit to be transmitted into a plurality of sub-bits, commonly referred to as "chips". Each data bit is typically divided into ten or more chips, and the apparent data rate and resultant bandwidth are increased proportionally. The process of dividing each data bit into smaller sub-bits is generally referred to as chipping and is based on a predetermined spreading code known as a pseudo noise (PN) sequence.

Unlike FH systems, DS systems are not limited by channel spacing for a particular transmission. For example, the only bandwidth requirement is that DS signals stay within the overall available bandwidth such as that established by the FCC. Therefore, given the greater bandwidth availability, DS systems can generally transmit information at greater transmission rates than FH systems. As is known, greater bandwidth generally allows for greater data throughput capabilities.

A disadvantage of DS systems is that they are generally more susceptible to noise interference than FH systems. This is due to the fact that the transmitted information is spread over a wider bandwidth. Consequently, the information is more likely to be corrupted due to a noisy environment.

Accordingly, FH and DS systems each have their own particular advantages and disadvantages with respect to noise immunity, data throughput, gain, etc., as briefly discussed above. Recently, systems have been proposed which utilize the characteristics of both FH and DS systems. Such "hybrid" systems offer, at least theoretically, the advantage of flexibility between the characteristics of both FH and DS systems to achieve optimum performance. For example, the hybrid system can be varied to possess different FH and DS system traits to achieve the highest throughput data rate in view of known noise conditions in the surrounding environment.

Actually, implementing a hybrid system based on a combination of frequency hopping and direct sequence spreading unfortunately has been extremely difficult. For example, there have been problems associated with finding a modulation technique capable of effectively being utilized in such a hybrid system in a practical manner. In particular, there have been problems identifying a cost-effective modulation technique which can be combined with both frequency hopping and direct sequence spreading and still meet the bandwidth and side lobe limitations discussed above.

The two most common methods of modulating digital data in spread spectrum systems are phase shift keying (PSK) and minimum shift keying (MSK). DS systems typically use PSK modulation which provides significant processing gain to enable a system to satisfy gain requirements such as those imposed by the FCC. PSK modulation involves instantaneous changes in the phase state of a carrier signal. These instantaneous phase changes unfortunately result in relatively large side lobes which reduce spectral efficiency and increase the overall bandwidth needed to transmit the signal. The presence of large side lobes and increased bandwidth make it difficult to implement PSK modulation in a system which also employs frequency hopping. As mentioned above, frequency hopping systems are restricted by the relatively narrow channel spacing and side lobe restrictions. The side lobes generated using conventional PSK modulation typically would not meet the requirements for a FH system.

It is possible to employ an amplitude varying filter to minimize the side lobes produced using PSK modulation. The amplitude varying filter varies its level of attenuation of the modulated carrier signal during such times as the phase of the carrier is changed in order to minimize the side lobes. Although this type of non-constant envelope modulation is effective to reduce the side lobes, a number of difficulties arise in transmitting and receiving signals modulated using amplitude varying filters. For example, the system transmitter must include linear components which preserve the varying amplitude of the modulated signal as the signal passes through various amplifiers and mixers. If non-linear components were to be used, then each amplifier would attempt to amplify all portions of the varying amplitude modulated signal, including the side lobes, up to an upper limit. This would of course result in the side lobes being amplified to approximately the same level as the main lobe, defeating the purpose of the amplitude varying filter. Unfortunately, linear components are expensive, space consuming, and present a high current draw on a system power supply. Accordingly, it is undesirable to attempt to utilize PSK modulation in a hybrid system which employs both direct sequence encoding and frequency hopping.

FH systems typically use a modulation technique such as Gaussian MSK modulation (GMSK) which results in a modulated signal with a relatively narrow bandwidth and low side lobe levels which allow signals being transmitted to remain within the permitted channel spacing as discussed above. Unfortunately, GMSK modulation does not allow for the high data throughput rates available using PSK modulation. It is difficult therefore to utilize GMSK modulation in a DS system and still obtain sufficient processing gain. In addition, GMSK modulation oftentimes uses the above-discussed amplitude varying filter signal which requires relatively expensive linear components in the transmitter.

In view of the aforementioned shortcomings associated with FH and DS systems, there is a strong need in the art for a hybrid system which takes advantage of the benefits of each system. As noted above, however, the modulation techniques typically employed in FH systems are not well suited in DS systems and vice versa. Hence, there is a strong need in the art for a modulation technique which can be utilized in an FH/DS hybrid system in a cost effective manner. Specifically, there is a strong need for a modulation technique which can be used in both FH and DS systems and which does not require non-constant amplitude modulation and corresponding expensive linear parts.

In particular, there is a strong need for a modulation technique which provides a constant amplitude modulated waveform having low side lobes. Such a modulation technique is needed to preserve the high noise tolerance capabilities associated with FH systems and the high data throughput capabilities of DS systems.

SUMMARY OF THE INVENTION

In accordance with one particular aspect of the invention, a modulation method is provided comprising the step of producing a carrier signal which transitions in phase between predetermined phase states as a function of the data, wherein a rate at which the carrier signal changes phase during a transition between the predetermined phase states varies substantially sinusoidally. The modulation method is capable of providing a constant amplitude modulated waveform having low side lobes. Such modulation method preserves the high noise tolerance capabilities associated with FH systems and the high data throughput capabilities of DS systems.

In accordance with another aspect of the invention, a transmitter for transmitting data is provided. The transmitter includes a circuit for producing a carrier signal which transitions in phase between predetermined phase states as a function of the data, wherein a rate at which the carrier signal changes phase during a transition between the predetermined phase states varies substantially sinusoidally, and a radio frequency circuit for transmitting the carrier signal.

According to still another aspect of the invention, a method of transmitting data is provided comprising the step of producing a carrier signal which transitions in phase between predetermined phase states as a function of the data, wherein a rate at which the carrier signal changes phase during a transition between the predetermined phase states gradually increases from zero at a beginning of the transition and gradually decreases to zero at an end of the transition.

In accordance with yet another aspect of the invention, a transmitter for transmitting data is provided including a circuit for producing a carrier signal which transitions in phase between predetermined phase states as a function of the data, wherein a rate at which the carrier signal changes phase during a transition between the predetermined phase states gradually increases from zero at a beginning of the transition and gradually decreases to zero at an end of the transition, and also including a radio frequency circuit for transmitting the carrier signal.

According to still another aspect, a cellular communication system is provided. The cellular communication system includes a network, a host computer coupled to the network, a plurality of base stations coupled to the network and communicating with the host computer, each of the base stations comprising a base station transceiver for transmitting and receiving wireless communications, and a plurality of mobile terminals each for communicating with the network by way of at least one of the plurality of base stations, each of the plurality of mobile terminals having a mobile terminal transceiver for transmitting and receiving wireless communications with respect to the at least one of the plurality of base stations. The transceiver of at least one of the mobile terminals or base stations includes a transmitter portion for transmitting data. The transmitter portion includes a circuit for producing a carrier signal which transitions in phase between predetermined phase states as a function of the data, wherein a rate at which the carrier signal changes phase during a transition between the predetermined phase states varies substantially sinusoidally, and also includes a radio frequency circuit for transmitting the carrier signal.

In accordance with another aspect, a radio for communicating in a spread spectrum communication system is provided, the radio including a spread spectrum receiver for receiving information; and a spread spectrum transmitter for transmitting information, the transmitter having a circuit for producing an RF signal which transitions in phase between predetermined phase states as a function of the information to be transmitted, wherein a rate at which the RF signal changes phase during a transition between the predetermined phase states varies substantially sinusoidally.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
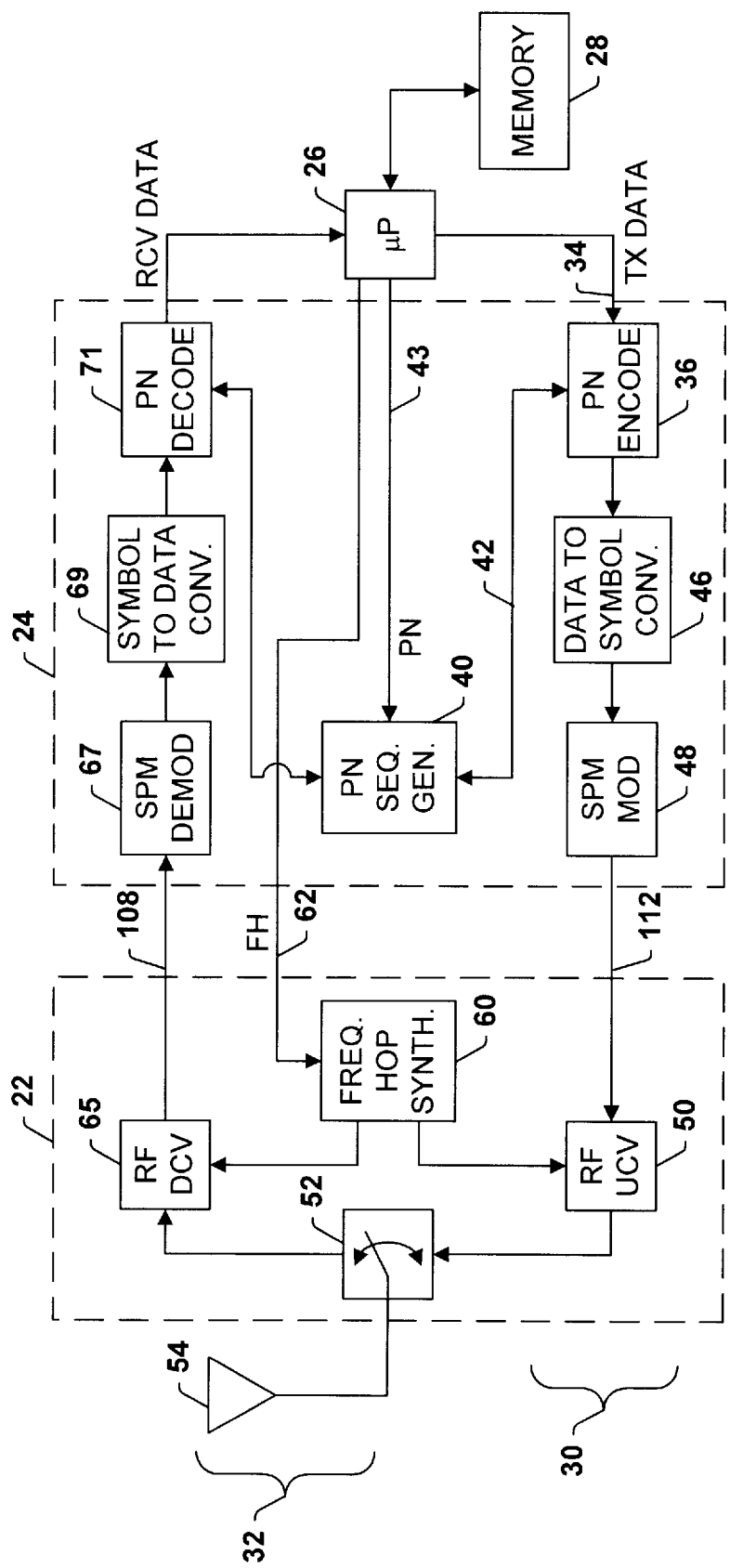
FIG. 1 is a block diagram of a hybrid FH/DS system transceiver in accordance with the present invention.

The present invention will now be described with reference to the drawings, wherein like reference numerals are used to refer to like elements throughout.

Referring initially to FIG. 1, a transceiver 20 in accordance with the present invention is shown for use in a hybrid system which employs both FH and DS spread spectrum techniques. As is explained more fully below, the transceiver 20 utilizes a modulation technique referred to herein as sinusoidal phase modulation (SPM). SPM does not rely on abrupt changes in carrier phase and consequently does not exhibit side lobes on the order of those found in other modulation techniques such as PSK. Moreover, SPM does not rely on non-constant amplitude modulation or filtering as in many GMSK techniques.

As a result, SPM is useful for modulating a carrier to produce a constant amplitude carrier signal having a phase which changes in accordance with data to be transmitted. Such a modulation technique can be employed in a FH/DS hybrid system so as to retain the high noise tolerance capabilities associated with narrow bandwidth FH systems and the high data throughput capabilities of DS systems. SPM is particularly suited for such a hybrid system for the reason that it does not require the relatively expensive linear components associated with amplitude varying filters as discussed above.

The transceiver 20 as shown in FIG. 1 includes a radio frequency (RF) section 22 and a modulation section 24. In addition, the transceiver 20 includes a microprocessor 26 for controlling the operation of the RF section 22 and the modulation section 24. The microprocessor 26 also functions to perform various operations involved in the processing of data transmitted and received by the transceiver 20. These operations include such items as processing data packets, data manipulation, data storage, etc., the specific operations of the transceiver 20 being dependent on the particular application as will be appreciated. A memory 28 such as a RAM or the like also is included in the transceiver 20 and can serve as data storage. In addition, the memory 28 may store appropriate operating code to be executed by the microprocessor 26 for carrying out the functions described herein. The manner in which the microprocessor 26 can be programmed to carry out such functions will be readily apparent to those having ordinary skill in the art based on the description provided herein.

The transceiver 20 includes a transmitter section 30 and a receiver section 32. When transmitting information, the microprocessor 26 provides serial binary data to be transmitted on line 34 to a PN encoder circuit 36. Using conventional direct sequence spreading techniques, the PN encoder circuit 36 spreads the data using a predetermined PN spreading sequence provided by a PN sequence generator 40. Specifically, the PN sequence generator 40 provides a PN sequence to the PN encoder circuit 36 via line 42. The PN sequence is preselected to divide each data bit provided by the microprocessor 26 into N chips, where N equals the number of bits in the PN sequence. In the preferred embodiment, the PN sequence generator 40 is programmable such that the microprocessor 26 can program the PN sequence generator 40 via line 43 to provide a desired PN sequence.

The direct sequence spread data from the PN encoder circuit 36 is input serially to a data-to-symbol conversion circuit 46 which converts the spread data into a sequence of symbols. In the exemplary embodiment, a four-point quadrature mapping scheme is utilized as is discussed below in connection with FIG. 2. Generally, each pair of chips in the spread data sequence is converted to one of four different symbols. The data-to-symbol conversion circuit 46 outputs the symbol data to an SPM modulator 48. As is described more fully below, the SPM modulator 48 employs what is referred to herein as sinusoidal phase modulation to phase modulate a carrier to produce a modulated constant-amplitude carrier signal. The constant-amplitude carrier signal transitions in phase between predetermined values as a function of the symbol data.

More significantly, the rate at which the carrier signal transitions in phase varies sinusoidally. By sinusoidally varying the rate at which the phase of the carrier signal transitions between predetermined values, or "phase states", the SPM modulator 48 reduces significantly the presence of undesirable side lobes found in conventional FH and DS systems.

The modulated constant-amplitude carrier signal is output from the SPM modulator 48 to the input of an RF upconverter circuit 50 which filters and mixes the output from the SPM modulator 48 up to the desired RF carrier frequency. In this sense, the output of the SPM modulator 48 actually represents an intermediate frequency carrier. However, for purposes of the invention the SPM modulator 48 is considered to modulate a carrier signal regardless of whether the frequency of the carrier is an intermediate frequency or the RF carrier frequency at which a signal is ultimately transmitted.

The output of the RF upconverter circuit 50 is provided to the transmit terminal of an antenna switch 52. When the antenna switch 52 is in a transmit position, the modulated RF carrier signal from the RF upconverter circuit 50 is coupled to an antenna 54 which is used to transmit the signal. Alternatively, when the antenna switch 52 is in a receive position, signals received by the antenna 54 are input to the receiver section 32 of the transceiver 20 as discussed below. The antenna switch 52 can be any type of switch for switching the antenna 54 between a transmitting mode and a receiving mode. For example, the antenna switch 52 can be a PIN-diode based single pole-double throw (SPDT) switch as is known. A switch control line (not shown) couples the antenna switch 52 to the microprocessor 26 to allow the microprocessor 26 to control whether the antenna 54 is in the transmitting mode or the receiving mode. The antenna 54 can be any of a variety of types of antennas. For example, the antenna 54 may be an omni, yagi or other type depending on the particular gain/direction requirements.

As is discussed below in more detail in relation to FIG. 8, the RF upconverter circuit 50 is driven in part by a frequency hop synthesizer 60. The frequency hop synthesizer 60 provides appropriate sinusoidal intermediate and RF carrier frequency signals to the RF upconverter circuit 50 such that the modulated RF carrier signal hops between different FH channels in accordance with the system requirements. By outputting different intermediate and RF carrier frequency signals which are mixed with the output of the SPM modulator 48, the modulated RF carrier signal will hop in accordance with a desired frequency hopping sequence. The output of the frequency hop synthesizer 60 is controlled by the microprocessor 26 via line 62.

By virtue of the frequency hopping initiated by the frequency hop synthesizer 60 and the direct sequence spreading provided by the PN encoder 36, the transceiver 20 represents a hybrid system which employs both FH and DS techniques. However, it is the SPM modulator 48 combined with these aspects which allow for a modulated carrier signal having sufficiently low side lobe levels to be produced, thus making the transceiver 20 practical. Because the SPM modulator 48 is capable of producing a modulated constant amplitude carrier signal with low side lobe levels, the transceiver 20 does not require linear components for the reasons discussed above.

Describing now the receiver section 32 of the transceiver 20, a signal is received by the transceiver 20 via the antenna 54 with the antenna switch 52 in the receive position. Specifically, the signal received by the antenna 54 is coupled via the receive terminal of the antenna switch 52 to the input of an RF downconverter circuit 65. The RF downconverter circuit 65 is driven by the same frequency hop synthesizer 60 so as to mix down the received signal by applying the same frequency hopping sequence. The RF downconverter circuit 65 mixes the received signal down to the intermediate carrier frequency of an SPM demodulator 67, and outputs the mixed down signal to the SPM demodulator 67. The SPM demodulator 67 demodulates the signal in a manner described in more detail with respect to FIG. 8 in order to obtain the modulated symbol data. Such symbol data is then input to a symbol-to-data conversion circuit 69 which converts the symbol data back into binary data. The binary data is despread by a PN decoder 71 using conventional techniques, and the despread data is provided to the microprocessor 26 for appropriate processing, manipulation, storage, etc., depending on the particular application.

Figure 2:
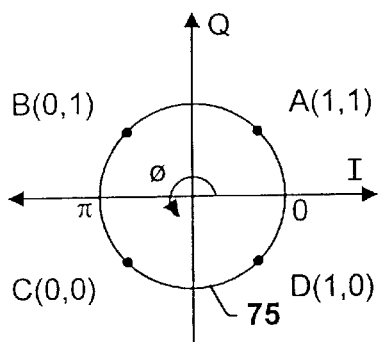
FIG. 2 is a constellation plane representing the I and Q components of a constant amplitude carrier signal as used in an exemplary embodiment of the present invention.

Referring now to FIGS. 2–7, the general theory relating to SPM modulation in accordance with the invention will now be described. FIG. 2 shows an exemplary constellation plane representing the I and Q components of a constant amplitude carrier signal as used in the present invention. As shown, four separate points are represented on the unit circle 75. Those skilled in the art will appreciate that the unit circle 75 is defined by $I^2+Q^2=1$, where I and Q represent the quadrature components used to modulate the phase of a sinusoidal carrier such that:

I=cos($\omega$t) and Q=sin($\omega$t); and
the phase $\phi$ of the modulated carrier is represented by:
$\phi$=arctan (Q/I).

In the exemplary embodiment, the four separate points are represented by symbol data A, B, C and D, respectively, as described in Table I:

TABLE I

| SYMBOL | I | Q | phase $\phi$ (radians) |
|---|---|---|---|
| A(1,1) | 0.7071 | 0.7071 | $\pi/4$ |
| B(0,1) | −0.7071 | 0.7071 | $3\pi/4$ |
| C(0,0) | −0.7071 | −0.7071 | $5\pi/4$ |
| D(1,0) | 0.7071 | −0.7071 | $7\pi/4$ |

The symbol data A–D represent respective phase states of the carrier on the unit circle. In this example, the symbol A is used to represent binary data bits (1,1), the symbol B is used to represent binary data bits (0,1), the symbol C is used to represent binary data bits (0,0), and the symbol D is used to represent binary data bits (1,0). By steering the phase of the carrier signal being modulated to that of either symbols A, B, C or D, the symbol data is effectively modulated onto the carrier as will be appreciated.

Figure 3:
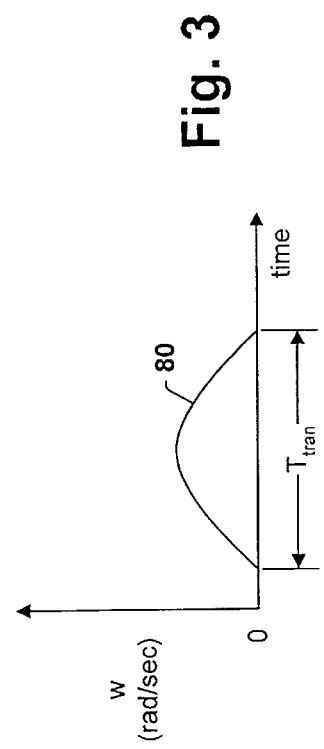
FIG. 3 is a waveform diagram illustrating how the rate at which the phase of a modulated constant amplitude carrier signal changes sinusoidally in accordance with the present invention.

If conventional PSK modulation techniques were applied using the constellation plane shown in FIG. 2, the phase $\phi$ of the carrier signal would change essentially instantaneously among symbols A–D as the symbol data is modulated onto the carrier. As discussed above, however, such abrupt changes in phase result in undesirably high side lobes. According to the SPM technique of the present invention, the phase of the carrier is controlled so as to change gradually rather than abruptly. Specifically, as shown in FIG. 3 the rate at which the carrier changes phase from one symbol (e.g., symbol A) to another symbol (e.g., symbol C) varies sinusoidally with respect to time. For example, suppose a time period $T_{tran}$ is provided for the modulated carrier signal to transition from phase $\pi/4$ (symbol A) to phase $5\pi/4$ (symbol C). The angular velocity (in radians/second) representing the phase change rate at the beginning and end of the transition period $T_{tran}$ is zero as the phase state of the carrier signal is fixed with respect to symbols A and C, respectively. However, during the transition period $T_{tran}$, the phase of the carrier is driven such that the rate at which the phase of the carrier changes gradually increases from zero until it reaches a maximum approximately half way through the transition period $T_{tran}$. The phase change rate then gradually begins to decrease until finally reaching zero at the end of the transition period $T_{tran}$.

Figure 4:
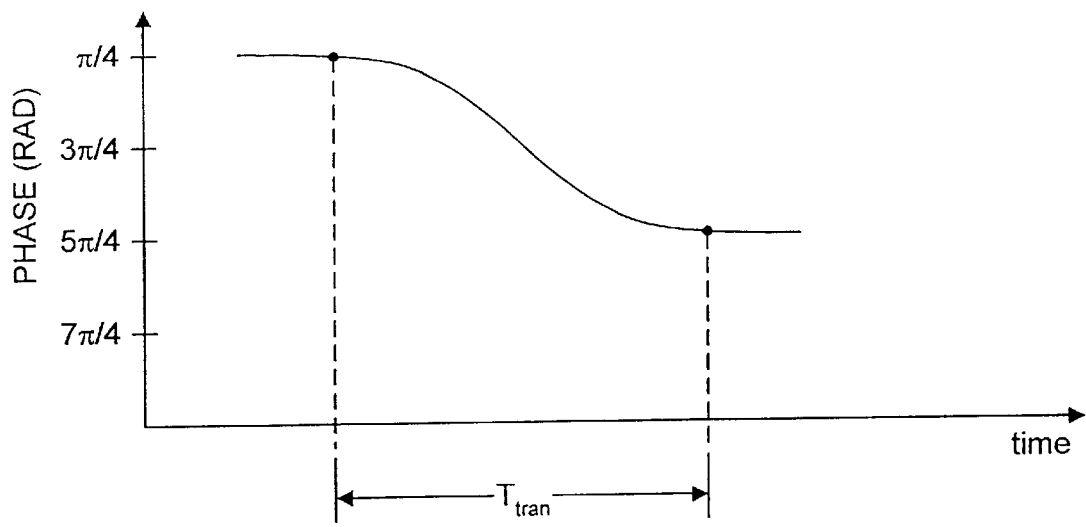
FIG. 4 is a waveform diagram showing the phase of a carrier signal changing sinusoidally in accordance with the present invention.
Figure 5:
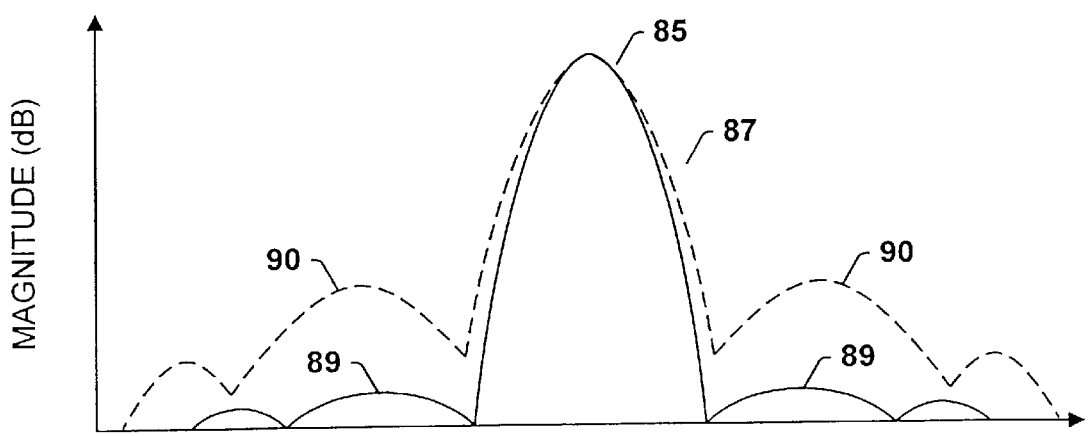
FIG. 5 is a frequency diagram comparing a carrier signal modulated using SPM in accordance with the present invention and a carrier signal modulated using PSK or MSK.

The curve 80 shown in FIG. 3 represents the variation in the phase change rate during the transition period $T_{tran}$. In the preferred embodiment, the curve 80 represents a sinewave from 0 to $\pi$ radians. Hence, the phase itself of the carrier signal will also change sinusoidally with respect to time during the transition period $T_{tran}$. For example, FIG. 4 illustrates how the phase of the carrier changes sinusoidally as the carrier transitions from phase state A ($\pi/4$) to phase state C($5\pi/4$). It has been found by the present inventor that by changing the phase of the carrier at a rate which varies sinusoidally, the resultant side lobes are substantially lower than those associated with conventional PSK or MSK techniques. As an example, FIG. 5 illustrates how the frequency spectrum of the carrier signal modulated using SPM can be represented by curve 85 shown in solid line. The frequency spectrum of a carrier signal modulated using conventional PSK or MSK techniques can be represented by curve 87 shown in dashed line. The side lobes 89 of the SPM modulated carrier are substantially lower than the side lobes 90 of the PSK or MSK modulated carrier. Although the side lobes 90 of the MSK modulated carrier will typically be lower than those of the PSK modulated carrier, the side lobes 89 attributed to the SPM of the present invention are significantly lower and make it possible to produce a hybrid FH/DS system in a cost effective manner.

Figure 6:
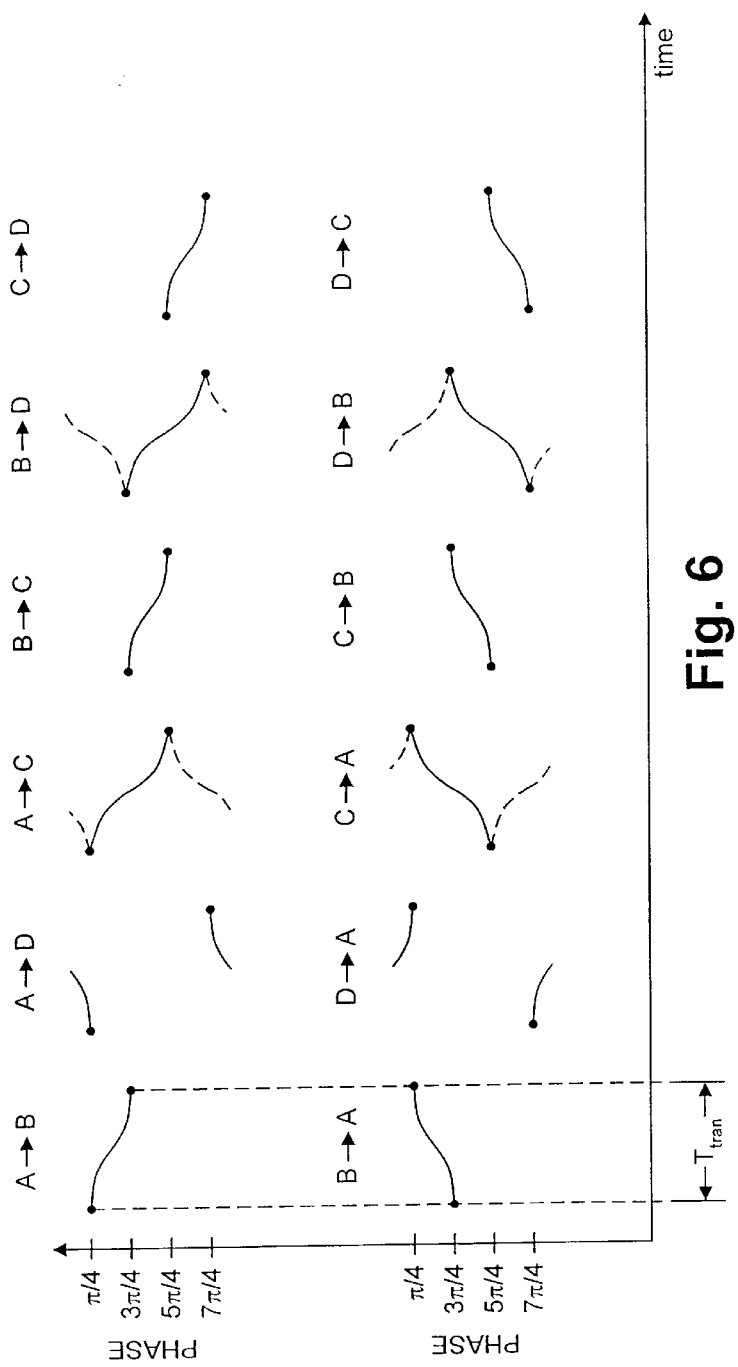
FIG. 6 is a waveform diagram showing the various phase transitions using SPM based on the constellation plane of FIG. 2 in accordance with the present invention.

The above description pertaining to FIG. 4 dealt specifically with the example where the carrier signal is modulated to change from phase state A to phase state C. It will be appreciated that the same principles can be applied to all possible transitions between phase states. For example, FIG. 6 includes several waveforms illustrating the manner in which the phase of the modulated carrier changes sinusoidally with respect to time within each of the possible transitions. In FIG. 6, A→B represents the change from phase state A to phase state B, B→A represents the change from phase state B to phase state A, and so on.

According to the preferred embodiment of the invention, it is preferred that the transition of the carrier between respective phase states occurs along the shortest path on the unit circle 75 (FIG. 2). Thus, for example, the transition A→D preferably occurs by way of the carrier phase shifting clockwise about the unit circle 75 rather than counterclockwise. Such preference is reflected in the transitions shown in FIG. 6. In the event of a transition between phase states which are $\pi$ radians out of phase with each other (e.g., A⇋C or B⇋D), the carrier phase may be shifted in either direction. Thus, these transitions as shown in FIG. 6 reflect the phase change in one direction by a solid line and in the other direction by a dashed line.

Figure 7:
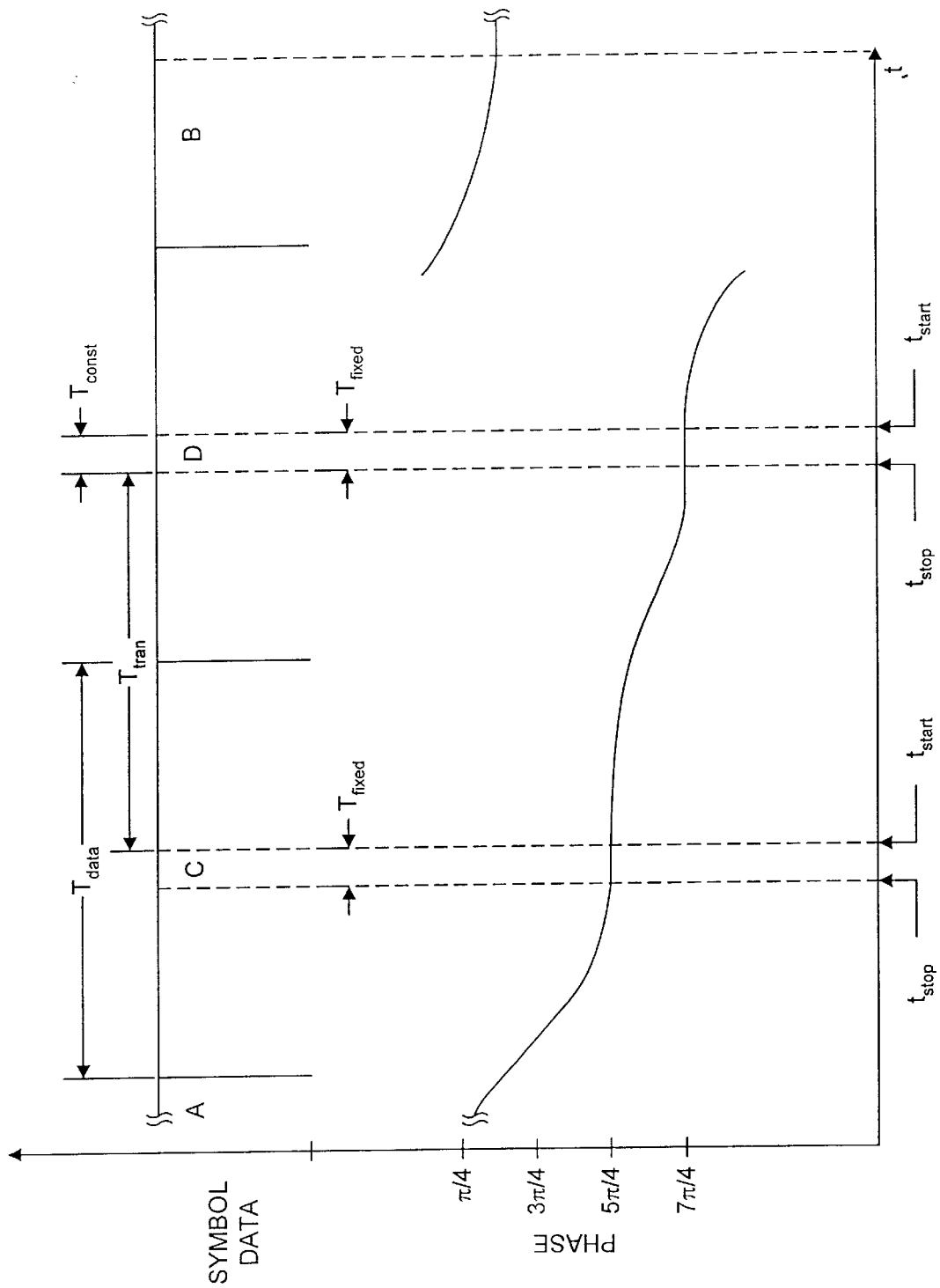
FIG. 7 is a waveform diagram illustrating the changes in phase of the modulated carrier signal with respect to data being transmitted in accordance with the present invention.

The above discussed aspects relating to SPM will now be described in relation to the transceiver 20 of FIG. 1. As an example, a symbol data sequence ACDB is input from the data-to-symbol converter 46 to the SPM modulator 48. FIG. 7 is a waveform diagram representing the timing of the symbol data sequence ACDB and the corresponding phase of the modulated carrier signal output by the SPM modulator 48. In the preferred embodiment, the symbol data is processed at a symbol rate corresponding to $1/T_{data}$, where $T_{data}$ represents the symbol period with respect to time. According to the preferred embodiment, the transition period $T_{tran}$ between respective phase states occurs across 90% of the symbol period. Thus, $T_{tran}$ is set equal to $0.90*T_{data}$. The phase of the modulated carrier signal remains fixed at a respective phase state during the remaining 10% of the symbol period (designated $T_{fixed}$).

In the preferred embodiment, the fixed period $T_{fixed}$ is centered in the middle of the symbol period $T_{data}$ with respect to each symbol data. The transition period $T_{tran}$ begins at time $t_{start}$ and ends at time $t_{stop}$. Thus, beginning at time $t_{start}$ the phase of the carrier is modulated so as to transition from the current phase state to the next phase state during the last 45% of the current symbol data and the initial 45% of the next symbol data. As shown in FIG. 7, for example, the phase state of the modulated carrier begins transitioning at time $t_{start}$ from current phase state C ($5\pi/4$) and stops transitioning at the next phase state D ($7\pi/4$) at time $t_{stop}$. The transition period $T_{tran}$ thereby occurs during the last 45% of symbol data C and the initial 45% of symbol data D. After remaining fixed in phase state D for a period $T_{fixed}$, the phase of the carrier is then modulated so as to transition to phase state B ($3\pi/4$) during the next transition period $T_{tran}$ as shown in FIG. 7. It is noted that in each instance where the phase of the modulated carrier transitions from one phase state to another, the phase of the carrier and, hence, the rate of change of the carrier phase varies sinusoidally as represented in FIG. 7.

Figure 8:
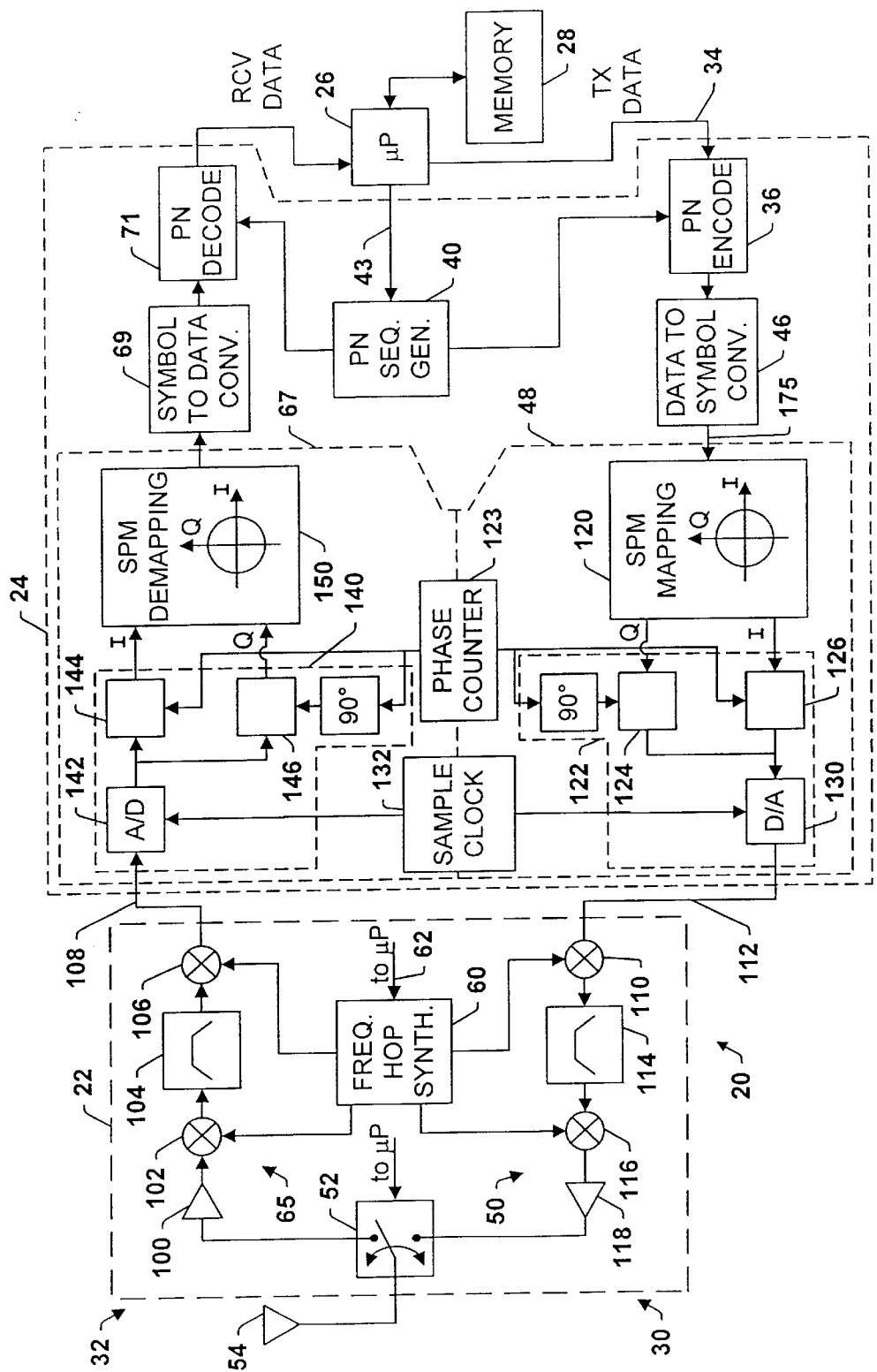
FIG. 8 is a detailed block diagram of the transceiver of FIG. 1 in accordance with the present invention.

Referring now to FIG. 8, a detailed block diagram of the transceiver 20 is shown. The RF downconverter circuit 65 includes a low noise amplifier (LNA) 100 which amplifies signals received by the antenna 54 which are to be demodulated to extract transmitted data. The output of the LNA 100 is provided to a mixer 102 which mixes the incoming RF signal (e.g., 900 MHz or 2.4 GHz) down to a first intermediate frequency, e.g., in the range of 200 to 500 MHz. The output of the mixer 102 is provided to a surface acoustic wave (SAW) filter 104 which filters the incoming signal to reduce any undesired noise. Thereafter, the output of the SAW filter 104 is provided to a mixer 106 which mixes the signal down further to a second intermediate frequency. Preferably, the mixer 106 mixes the signal down to a frequency on the order of 25 MHz. The thus downconverted signal is then input to the SPM demodulator 67 via line 108 as shown.

The RF upconverter 50 includes a mixer 110 for mixing the output of the SPM modulator 48 as provided on line 112 up to the first intermediate frequency. A SAW filter 114 is provided to filter the output of the mixer 110 so as to reduce any mixing by-products which may have occurred during the modulation process. The output of the SAW filter 114 is subsequently mixed by mixer 116 up to the RF carrier frequency. The output of the mixer 116 is then input to power amplifier 118 where the RF modulated signal is amplified prior to being transmitted via the antenna 54 and antenna switch 52.

Each mixer 102, 106, 110 and 116 as shown in FIG. 8 is coupled to the frequency hopping synthesizer 60. Using known techniques, the frequency hopping synthesizer 60 provides the appropriate mixing frequencies to each of the mixers so as to follow a predetermined hopping sequence. More specifically, by altering the mixing frequencies provided to the mixers 110 and 116 according to a hopping sequence, the signals transmitted by the transceiver 20 will hop in frequency between respective FH channels. Similarly, by altering the mixing frequencies provided to the mixers 102 and 106 according to the hopping sequence, signals received by the transceiver 20 are downconverted in correspondence with the appropriate hopping sequence. In each case, however, the frequency of the modulated and demodulated signals in the modulation section 24 remains the same during such frequency hopping.

FIG. 8 also shows the SPM modulator 48 and SPM demodulator 67 in more detail. Referring first to the SPM modulator 48, the symbol data from the data-to-symbol converter 46 is input to an SPM mapping circuit 120. As will be explained in more detail below, the SPM mapping circuit 120 provides the appropriate I and Q components corresponding to the phase states represented by the symbol data during the time periods $T_{fixed}$. In addition, the SPM mappping circuit 120 provides the appropriate I and Q components during the times $T_{tran}$ when the phase of the carrier is to transition from one phase state to another. The values of the I and Q components are controlled during such transition times $T_{tran}$ so as to ensure that the phase of the modulated carrier signal changes at a rate which varies sinusoidally. At the same time, the values of the I and Q components are controlled in such a way that I and Q continue to satisfy the relationship $I^2+Q^2=1$. This guarantees that the modulated carrier will remain a constant-amplitude waveform.

The I and Q components are output in digital form from the SPM mapping circuit 120 and are subsequently provided to a digital quadrature modulator 122. The digital quadrature modulator 122 digitally modulates the I and Q components onto a sinusoid carrier signal the frequency and relative phase of which is determined by a phase counter 123 which provides a digital reference signal to the modulator 122.

The digital quadrature modulator 122 can be of conventional design such as that described in U.S. Pat. No. 5,225, 795 to Iinuma. As is discussed in detail in the '795 patent, the modulator 122 includes first and second storage devices 124 and 126 for receiving the Q and I components, respectively, from the SPM mapping circuit 120 and carrier phase information from the phase counter 123. The phase information provided to the first storage device 124 from the phase counter 123 is shifted by π/2 radians. The I and Q components together with the phase information from the phase counter 123 serve as addresses to the respective storage devices. The storage devices 124 and 126 have stored therein at the corresponding addresses the multiplication result of the respective I and Q components and the reference signal. This information is output from each storage device and the respective outputs are added and then converted into an analog signal by a digital-to-analog (D/A) converter 130. The resultant modulated analog signal is then output by the SPM modulator 122 to the RF upconverter circuit 50 via line 112. The entire disclosure of U.S. Pat. No. 5,225,795 is incorporated herein by reference.

The digital quadrature modulator 122 is utilized in the exemplary embodiment due to its ability to function even at very high data rates. In another embodiment, however, the digital quadrature modulator 122 is replaced with a conventional analog quadrature modulator which is well known in the art. Such analog quadrature modulators, although not currently capable of handling the same high data rates, are currently lower in cost. In the event an analog quadrature modulator is used in place of the digital embodiment shown in FIG. 8, the output of the SPM mapping circuit 120 will include a digital-to-analog converter for each of the I and Q outputs.

In the preferred embodiment, the phase counter 123 outputs the digital phase information at the desired intermediate frequency which is on the order of 25 MHZ. The D/A converter 130 is clocked by a sample clock 132 at a rate on the order of 200 MHZ which is eight times the digital intermediate frequency. This allows a representative analog signal to be created.

In the case of signals which are received by the transceiver 20, the output of the RF downconverter circuit 65 is provided via line 108 to a digital quadrature demodulator 140. The demodulator 140 includes an analog-to-digital converter (A/D) 142 which converts the analog signal received from mixer 106 into a digital signal. The output of the A/D 142 represents the incoming phase modulated signal and is provided as an address to each of first and second storage devices 144 and 146. In addition, the first and second storage devices 144 and 146 receive digital phase information from the phase counter 123 as an address, the phase information provided to the second storage device 146 from the phase counter 123 being shifted by π/2 radians. The storage devices 144 and 146 have stored therein corresponding values of the I and Q components in relation to such addresses, respectively. Thus, the digital demodulator 140 outputs the I and Q components of the received signal.

The A/D 142 is also clocked by the sample clock 132 as is the D/A 130. In order to adequately represent the entire waveform of the incoming signal received on line 108, the A/D 142 also is clocked at a frequency which is at least eight times the frequency of the incoming signal at that point in the transceiver 20. Assuming the incoming signal has a frequency of approximately 25 MHZ, the A/D 142 is clocked preferably at approximately 200 MHz.

The I and Q components from the digital demodulator 140 are provided to an SPM demapping circuit 150. The SPM demapping circuit 150 converts the I and Q components into the corresponding symbol data as described in more detail below in connection with FIG. 11. The SPM demapping circuit 150 then provides the symbol data to the symbol-to-data conversion circuit 69 which converts the symbol data into the corresponding binary data.

Much like the digital quadrature modulator 122, the digital quadrature demodulator 140 can be replaced by a conventional analog quadrature demodulator in another embodiment. In such case, the SPM demapping circuit 150 will include an analog-to-digital converter at the I and Q component inputs.

Referring again to the SPM mapping circuit 120, it is necessary that the circuit be capable of outputting digital data representative of the I and Q components both during the times when the phase state of the carrier is fixed and when the phase is transitioning between phase states. The following equations for I and Q can be derived to define the I and Q waveforms during the transition period $T_{tran}$ from a current phase state to a next phase state:

$$I=\cos(\phi_{current} \pm \Delta\phi \times (0.5-0.5\times\cos(\pi\times t/T_{tran})))$$

$$Q=\sin(\phi_{current} \pm \Delta\phi \times (0.5-0.5\times\cos(\pi\times t/T_{tran})))$$

where:
I=in-phase component;
Q=quadrature component;
$\phi_{current}$=phase state at beginning of transition period $T_{tran}$;
±=direction of phase rotation about unit circle: +1 for counterclockwise and −1 for clockwise;
$\Delta\phi=\phi_{current}-\phi_{next}$, where $\phi_{next}$ is the phase state at the end of the transition period $T_{tran}$, also referred to herein as the next phase state;

$T_{tran}$=transition period from the current phase state to the next phase state, beginning at time $t_{start}$ and ending at time $t_{stop}$; and t=real time, where t=0 at time $t_{start}$.

Based on these equations for I and Q, digital values for a plurality of points can be computed for I and Q for each of the possible transitions represented in FIG. 6. Ideally, the number of digital values for I and Q during each of the possible transitions corresponds to the number of phase increments provided by the phase counter 123 to the digital modulator 122 during the respective transitions. As examples, Tables II–IV below provide exemplary transition values for I and Q during a given transition. Tables II–IV provide eleven data points for each component over the duration of the transition period $T_{tran}$ (from $t_{start}$ to $t_{stop}$), the data points being equally spaced with respect to time. It will be appreciated, however, that another number of data points could be used without departing from the scope of the invention, and preferably substantially more data points are utilized so as to coincide with the resolution of the D/A 130.

TABLE II

I and Q Transition Data for A → B ($\pi/4$ → $3\pi/4$)

| Time Increment | I | Q | Phase φ (radians) |
|---|---|---|---|
| 0 (tstart) | 0.707 | 0.707 | 0.785 ($\pi/4$) |
| 1 | 0.679 | 0.734 | 0.824 |
| 2 | 0.593 | 0.805 | 0.936 |
| 3 | 0.445 | 0.895 | 1.109 |
| 4 | 0.240 | 0.971 | 1.328 |
| 5 | 0.000 | 1.000 | 1.571 |
| 6 | −0.240 | 0.971 | 1.813 |
| 7 | −0.445 | 0.895 | 2.032 |
| 8 | −0.593 | 0.805 | 2.206 |
| 9 | −0.679 | 0.734 | 2.317 |
| 10 (tstop) | −0.707 | 0.707 | 2.356 ($3\pi/4$) |

TABLE III

I and Q Transition Data for A → D ($\pi/4$ → $7\pi/4$)

| Time Increment | I | Q | Phase φ (radians) |
|---|---|---|---|
| 0 (tstart) | 0.707 | 0.707 | 0.785 ($\pi/4$) |
| 1 | 0.734 | 0.679 | 0.746 |
| 2 | 0.805 | 0.593 | 0.635 |
| 3 | 0.895 | 0.445 | 0.461 |
| 4 | 0.971 | 0.240 | 0.242 |
| 5 | 1.000 | 0.000 | 0.000 |
| 6 | 0.971 | −0.240 | −0.242 |
| 7 | 0.895 | −0.445 | −0.461 |
| 8 | 0.805 | −0.593 | −0.635 |
| 9 | 0.734 | −0.679 | −0.746 |
| 10 ($t_{stop}$) | 0.707 | −0.707 | −0.785 ($7\pi/4$) |

TABLE IV

I and Q Transition Data for B → D ($3\pi/4$ → $7\pi/4$)
(assuming counterclockwise)

| Time Increment | I | Q | Phase φ (radians) |
|---|---|---|---|
| 0 ($t_{start}$) | −0.707 | 0.707 | 2.356 ($3\pi/4$) |
| 1 | −0.759 | 0.651 | 2.426 |
| 2 | −0.884 | 0.487 | 2.653 |
| 3 | −0.991 | 0.137 | 3.002 |
| 4 | −0.955 | −0.296 | 3.438 |
| 5 | −0.707 | −0.707 | 3.927 |
| 6 | −0.296 | −0.955 | 4.416 |
| 7 | 0.137 | −0.991 | 4.852 |

TABLE IV-continued

I and Q Transition Data for B → D ($3\pi/4$ → $7\pi/4$)
(assuming counterclockwise)

| Time Increment | I | Q | Phase φ (radians) |
|---|---|---|---|
| 8 | 0.467 | −0.884 | 5.201 |
| 9 | 0.651 | −0.759 | 5.428 |
| 10 ($t_{stop}$) | 0.707 | −0.707 | 5.498 ($7\pi/4$) |

Figure 9:
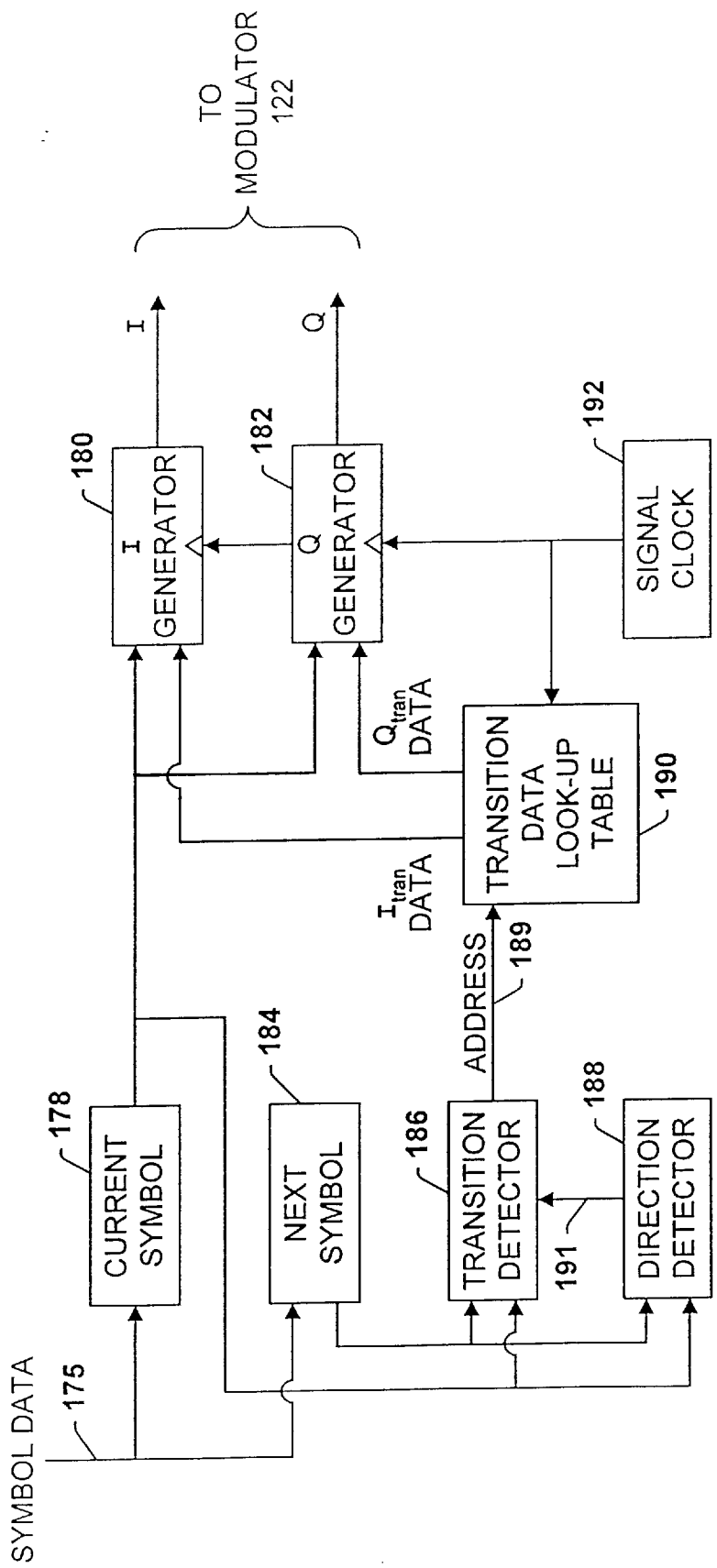
FIG. 9 is a block diagram of a SPM mapping circuit in accordance with the present invention.

Values of I and Q such as those presented above can be stored in a memory look-up table which is used by the SPM mapping circuit 120 to provide the values of I and Q to the digital modulator 122 during each transition period $T_{tran}$. For example, FIG. 9 represents an exemplary embodiment of the SPM mapping circuit 120. Symbol data from the data-to-symbol conversion circuit 46 is input via line 175. The symbol data (e.g., symbol A) representing the current phase state in the symbol data sequence is stored in current symbol register 178. The contents of current symbol register 178 are output to an I component generator 180 and a Q component generator 182. The generators 180 and 182 are designed such that during the fixed phase state period $T_{fixed}$ (e.g., FIG. 7), each of the generators outputs the fixed digital value corresponding to I and Q.

For example, when the current symbol is A, the I and Q generators 180 and 182 both output the fixed value 0.7071 as represented above in Table I during the time period $T_{fixed}$. In order to also provide the values of the I and Q components during the transition periods $T_{tran}$, however, the SPM mapping circuit 120 also includes a next symbol register 184 which stores the next symbol data immediately following the current symbol data in the symbol data sequence. The contents of the next symbol register 184 are output to a transition detector 186 and a transition direction detector 188. The contents of the current symbol register 178 are also output to the transition detector 186 and the transition direction detector 188. The transition detector 186 is designed to detect the particular phase transition which is to occur following the time period $T_{fixed}$ corresponding to the current symbol data as represented in FIG. 7. Specifically, the transition detector 186 compares the current symbol data to the next symbol data to identify the particular transition. For example, if the current symbol data is A and the next data symbol is C, then the transition detector 186 identifies the upcoming transition as A→C as represented in FIG. 6.

The direction detector 188 is designed to detect and store the phase change direction (i.e., clockwise or counterclockwise) of the immediately preceding phase transition. Hence, if prior to the current symbol data A in the symbol data sequence provided on line 175, the preceding symbol data was B, the direction detector would detect a clockwise transition about the unit circle 175 as shown in FIG. 2. As previously mentioned, the phase of the carrier is modulated preferably so as to take the shortest path about the unit circle. This information is stored in the direction detector 188 and is provided to the transition detector 186 via line 191. In the event the transition detector 186 detects a transition of π radians, meaning there is no shortest path, the transition detector 186 is configured to look to the information provided by the direction detector 188 to determine the direction of the previous phase transition. If the previous transition was in a clockwise direction, the transition detector 186 is configured to designate that the upcoming transition will be in the same direction. Hence, the transition from A→C would be designated to occur in a clockwise direction. Alternatively, had the previous phase transition been in a counterclockwise direction then the transition from A→C would be designated to occur in a counterclockwise direction. The direction detector 188 maintains such information relating to the direction of the immediately preceding transition, and provides such information to the transition detector 186 in such instances.

Figure 10:
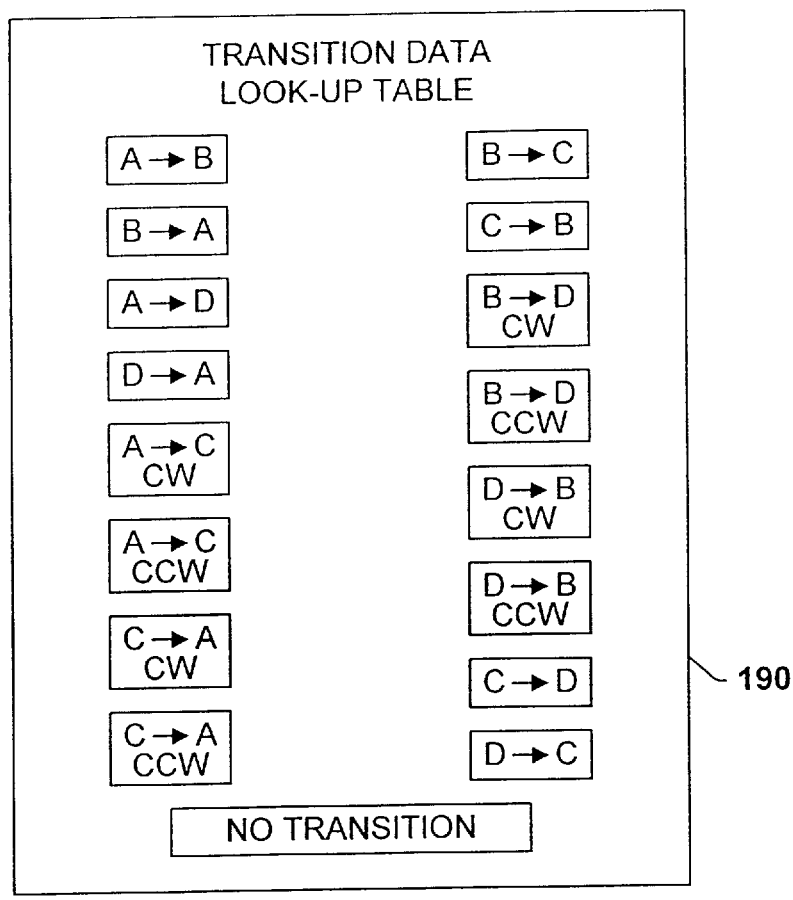
FIG. 10 is a diagram representing the contents of a memory look-up table including transition data in accordance with the present invention.

In view of the particular transition and direction information ascertained by the transition detector 186, the transition detector 186 is designed to output a starting address on line 189 to a transition data look up table 190. The particular starting address is indicative of a desired transition and direction which is upcoming. As represented in FIG. 10, the transition data look up table 190 is an addressable memory having stored therein the I and Q component values during the transition time $T_{tran}$ for each of the possible transitions and directions. Thus, the starting address accesses the appropriate set of I and Q component values for the upcoming transition. In the event there is no transition between the current and next symbols in the symbol data sequence (e.g., A→A, or B→B), the transition detector 186 addresses a no-transition indicator stored in the look up table 190.

Referring again to FIG. 9, a signal clock 192 provides a clock output which increments the addressing of the look-up table 190 beginning at time $t_{start}$ in the transition period $T_{tran}$ so that a sequence of digital I and Q component values corresponding to the transition are output throughout the transition period $T_{tran}$ until time $t_{stop}$. The same signal clock 192 output is used to clock the I and Q generators 180 and 182, respectively, during the transition period $T_{tran}$. The I and Q generators 180 and 182, respectively, are configured to output the values of I and Q as retrieved from the look up table 190 during each transition period $T_{tran}$. The I and Q component values are in turn provided to the SPM modulator 122 in order to be modulated onto the carrier as previously discussed. As will be appreciated, the inputs and outputs of the I and Q generators together with the provision of the I and Q component values from the look up table 190 are synchronized with the SPM modulator 122. The timing within the I and Q generators 180 and 182 is controlled relative to a symbol data clock such that the transitions occur during the last 45% of the current symbol data and the initial 45% of the next symbol data as discussed above with respect to FIG. 7.

If the transition detector 186 detects no transition between adjacent symbols, the no-transition indicator is output from the look up table 190 and provided to the I and Q generators 180 and 182 to indicate that there is no upcoming transition. The I and Q generators 180 and 182 then know to maintain the current values of I and Q at their respective outputs.

Figure 11:
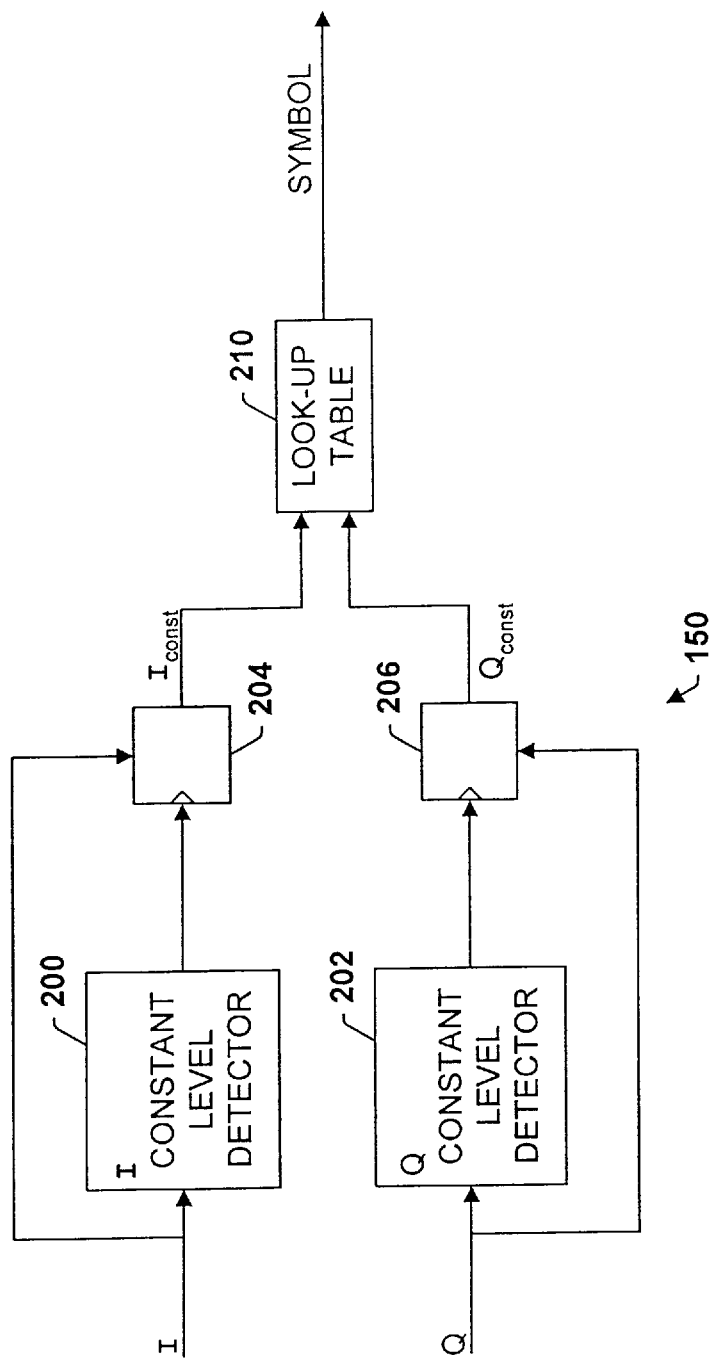
FIG. 11 is a block diagram representing a SPM demapping circuit in accordance with the present invention.

Turning now to FIG. 11, an exemplary embodiment of the SPM demapping circuit 150 in the SPM demodulating circuit 67 is shown. As described above in connection with FIG. 8, the digital quadrature demodulator 140 provides the digital I and Q values of the incoming signal to the SPM demapping circuit 150. The I and Q signals are input to I and Q constant level detectors 200 and 202, respectively. The constant level detectors 200 and 202 each are digital circuits configured to detect when the values of the I and Q signals remain constant within a predetermined threshold. As will be appreciated in view of FIG. 7, for each symbol data the I and Q signals will remain relatively constant during the time period T fixed. The constant level detectors 200 and 202 detect the I and Q values at such time, for example by determining when the derivative of the respective signals is substantially equal to zero with respect to time. At such time when the constant level detectors 200 and 202 determine that the I and Q signals are constant, the detectors provide a clock signal to respective latches 204 and 206 which latch the fixed value of the I and Q signals for each symbol. Although not shown, the SPM demodulating circuit 150 is reset at the beginning of each symbol data so as to be able to latch the fixed values of I and Q during the time period $T_{fixed}$ for each symbol data.

The values of I and Q are output from the latches 204 and 206, respectively, to the address input of a memory look up table 210. The look up table 210 has stored therein at the respective addresses the corresponding symbols such that the I and Q values are converted back into symbol data. The symbol data is then provided to the symbol-to-data converter 69 as shown in FIG. 8 where it is converted back into binary data. The binary data is then despread by the PN decoder 71, and the received data is provided to the microprocessor 26.

Figure 11A:
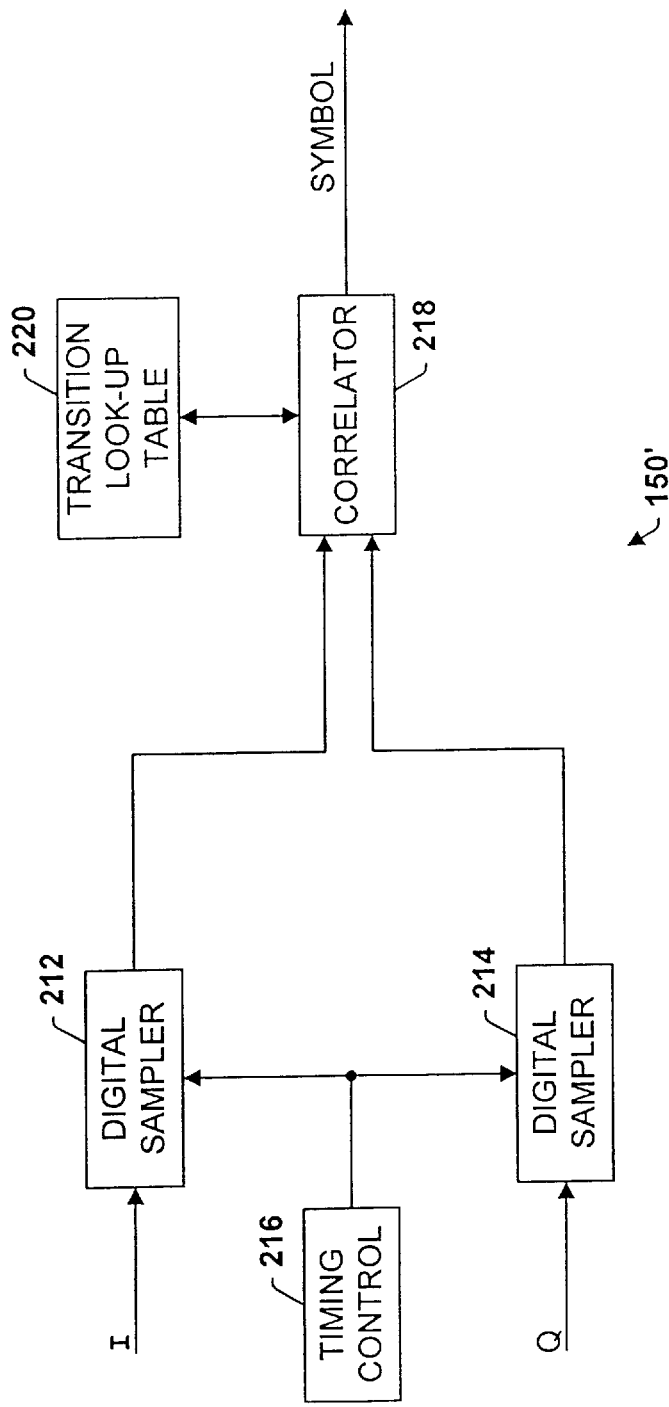
FIG. 11a is a block diagram representing a SPM demapping circuit in accordance with another embodiment of the present invention.

FIG. 11a illustrates another embodiment of the SPM demapping circuit 150, generally designated 150'. The digital quadrature demodulator 140 provides the digital I and Q values of the incoming signal to the SPM demapping circuit 150'. The I and Q signals are input into corresponding I and Q digital samplers 212 and 214, respectively. The digital samplers 212 and 214 are clocked by a timing control circuit 216 such that during each transition of the incoming signal from one phase state to another phase state, the digital samplers 212 and 214 obtain multiple samples of the corresponding I and Q values. In the exemplary embodiment, the digital samplers are controlled so as to obtain four samples during each transition period $T_{tran}$ at times $0.25*T_{tran}$, $0.50*T_{tran}$, $0.75*T_{tran}$ and $1.00*T_{tran}$ following time $t_{start}$, for example.

For each transition period, the samples are output from the digital samplers 212 and 214 and are input to a correlator circuit 218. Also connected to an input of the correlator circuit 218 is a transition look-up table 220. The transition look-up table 220 has stored therein four corresponding I and Q samples for each possible transition (including direction) between phase states. The correlator circuit 218 then compares the samples obtained by this digital samplers 212 and 214 for I and Q with the values of I and Q in the transition look-up table 220. Specifically, the correlator circuit 218 determines which corresponding I and Q values in the transition look-up table 220 exhibit the best correlation with those provided by the digital samplers 212 and 214 for a given transition. The particular phase state transition associated with the corresponding I and Q values, as determined from the transition look-up table 220, is identified by the correlator circuit 218. As a result, the symbol representing the phase state at the end of the transition period is output by the correlator circuit 218. The symbol data is then input to the symbol-to-data converter 69. Thus, the SPM demapping circuit 150' is able to identify the incoming symbol data based on the correlation of the I and Q component values during the transitions.

The timing control circuit 216 is synchronized using conventional techniques to the incoming signal based on the synchronizing bits provided with each incoming signal. Hence,.the timing control circuit 216 is able to provide the appropriate timing signals to the digital samplers 212 and 214 in order to control the sampling times as will be appreciated.

Figure 12:
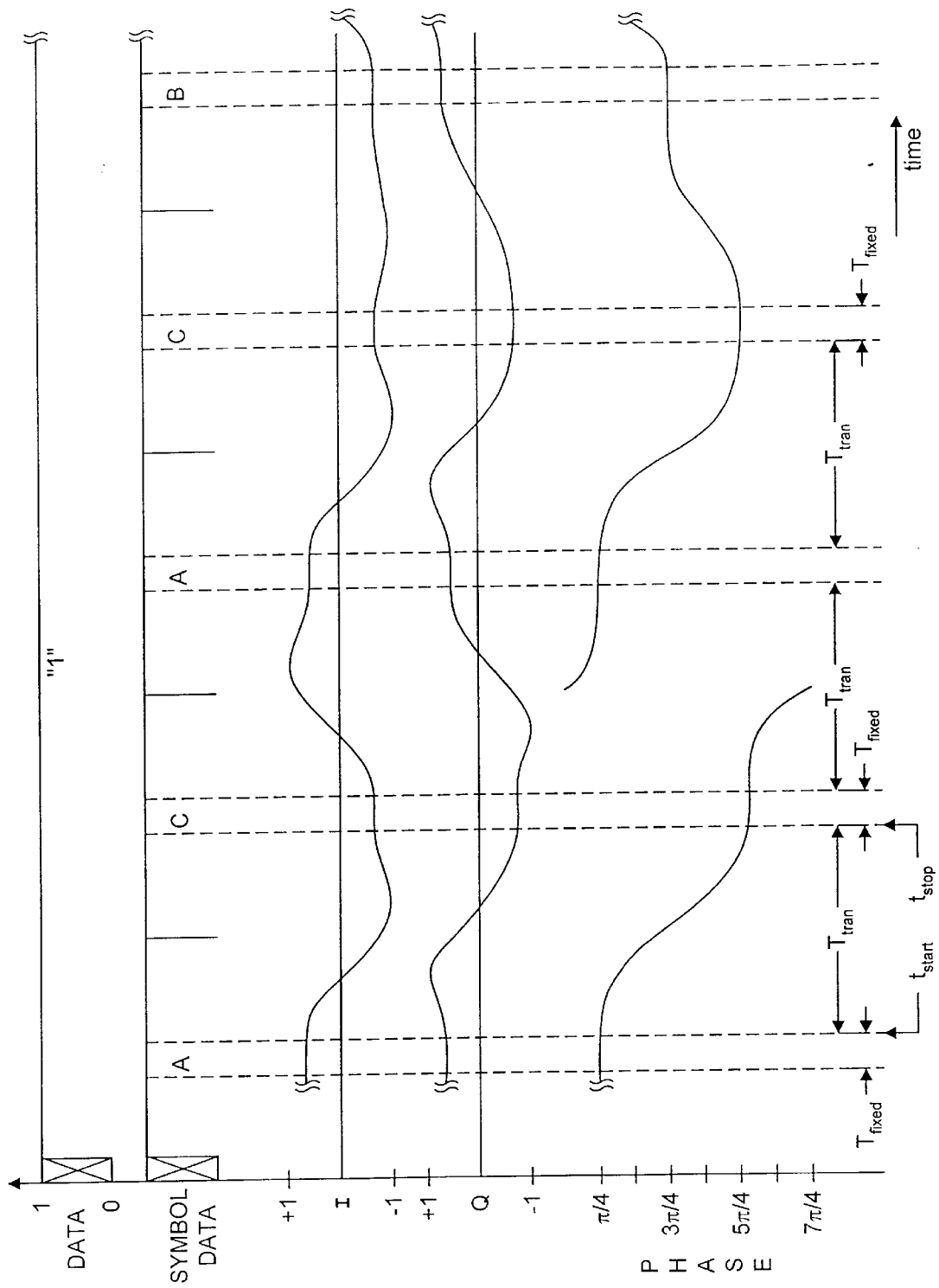
FIGS. 12 and 13 form a signal diagram illustrating the I and Q components and the phase of the modulated carrier signal in accordance with the present invention.
Figure 13:
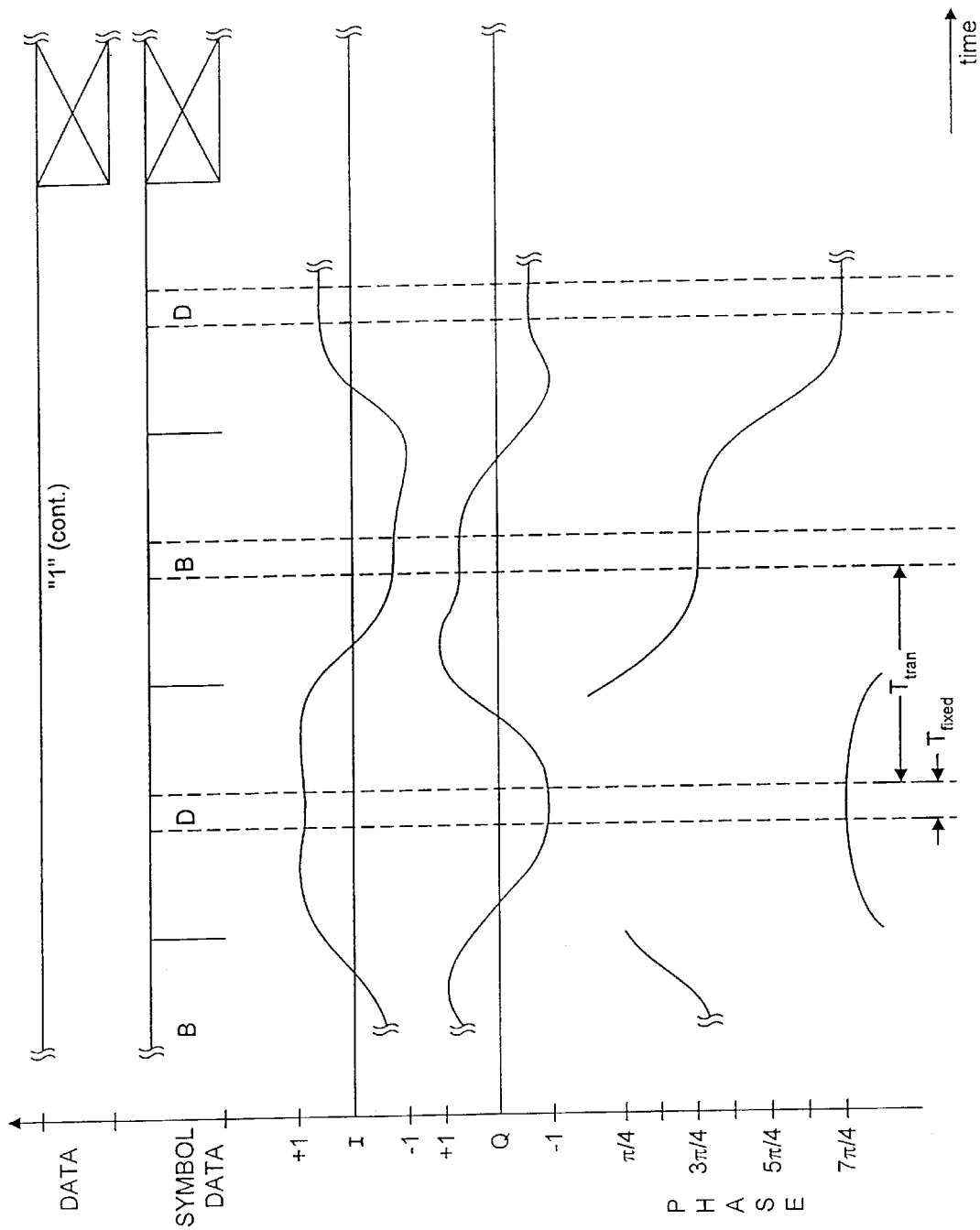

FIGS. 12 and 13 illustrate an example of the operation of the SPM modulation technique of the present invention for modulating DS spread data which is then transmitted using FH techniques. For purposes of illustration, assume that the PN code sequence provided by the PN sequence generator 40 (FIG. 8) to the PN encoder 36 is a sixteen-chip sequence as follows:

PN=1100110001100101.

As a result, binary data provided by the transmitter 26 on line 34 will be spread by the PN encoder 36 as follows:

| Binary Data Value | Spread Data Sequence |
|---|---|
| 0 | 0011001110011010 |
| 1 | 1100110001100101 |

The PN encoder 36 outputs the spread data sequence for each binary data value to the data-to-symbol conversion circuit 46 as shown in FIG. 8. As an example, suppose the binary data bit "1" is provided on line 34 to the PN encoder 36 in order to be transmitted. The PN encoder 36 will then spread the binary data to form the spread data sequence "1100110001100101". The data-to-symbol conversion circuit 46 in turn converts each pair of consecutive "chips" in the spread data sequence into a corresponding symbol. Thus, using the constellation plane described in FIG. 2, the spread data sequence "1100110001100101" becomes the symbol data sequence "ACACBDBD". This symbol data sequence is provided to the SPM mapping circuit 120 which in turn generates the appropriate values of the I and Q components corresponding to such symbols in accordance with the method described above.

FIGS. 12 and 13 illustrate the relevant signals produced in order to transmit the binary data value "1". The signal "DATA" represents the binary data value "1" to be transmitted as provided on line 34. The "SYMBOL DATA" signal represents the resultant symbol data sequence "ACACBDBD" as input to the SPM mapping circuit 120. The "I" and "Q" signals represent the I and Q values output by the SPM mapping circuit 120 in response to the symbol data sequence. Although the I and Q signals are represented as continuous waveforms, it will be appreciated that the signals are in fact digital signals which are provided to the digital modulator 122. The "PHASE" signal represents the resultant phase of the carrier upon being modulated by the digital modulator 122 based on the values of I and Q. It is noted that FIGS. 12 and 13 do not show the transitions occurring prior to and after the symbol data sequence "ACACBDBD". This is because the actual signal waveforms will depend on the preceding and subsequent symbol data. In the event there is no preceding or subsequent symbol data, the transceiver 20 can be designed to remain idle at one of the phase states as will be appreciated.

As is shown in FIGS. 12 and 13, the phase of the carrier changes at a rate which varies sinusoidally. The rate at which the phase changes, or the phase velocity, is low (e.g., zero) at the beginning and end of each transition period $T_{tran}$. In between the beginning and end of the transition period $T_{tran}$, the rate gradually increases and decreases, reaching a maximum during the middle of the transition period $T_{tran}$. In this manner, side lobes which may occur in the modulated carrier have been found to be very small in magnitude, and many db below the main lobe. Thus, it is not necessary to use amplitude varying filters to reduce the side lobes in order for the signal ultimately to be transmitted using frequency hopping via the RF section 22 (FIG. 1). As a result, the transceiver 20 does not require linear components which are more expensive, consume more power, and are larger in size so as to restrict miniaturization. A hybrid system based on FH and DS spreading becomes practical in the sense that the SPM modulation technique makes it possible to combine both forms of spreading at relatively low cost.

Although the above example utilizes a sixteen chip PN sequence, other length PN sequences are certainly possible.

For example, a shorter PN sequence (e.g., five-chip) can be combined with a different hopping rate and/or number of FH channels. It will be appreciated that the present invention is not limited to any particular PN sequence, PN sequence length, hopping rate, number of hopping channels, etc.

Referring again briefly to FIG. 8, the transceiver 20 is shown as a combination of discrete components. However, it will be appreciated that many of the components can be combined into one or more integrated circuits. For example, the entire modulation section 24 can be combined into a single application specific integrated circuit (ASIC). This allows the size of the transceiver 20 to be reduced together with manufacturing and assembly costs. Furthermore, by performing the modulation and demodulation digitally within the modulation section 24, several advantages are obtained. One advantage is the reduction of space consuming components on a radio card. When modulation and demodulation are performed using an analog waveform, several large and costly components are required to modulate precisely and demodulate a waveform. These components generally draw high current and take up valuable space on the radio card which may add to the overall size of the system within which the radio is operating. Furthermore, the digitized waveforms are more easily manipulated by the microprocessor 26, the mapping and demapping circuits 120 and 150, etc., and therefore allow for employment of more sophisticated modulation techniques which can help enhance overall system performance.

Figure 14:
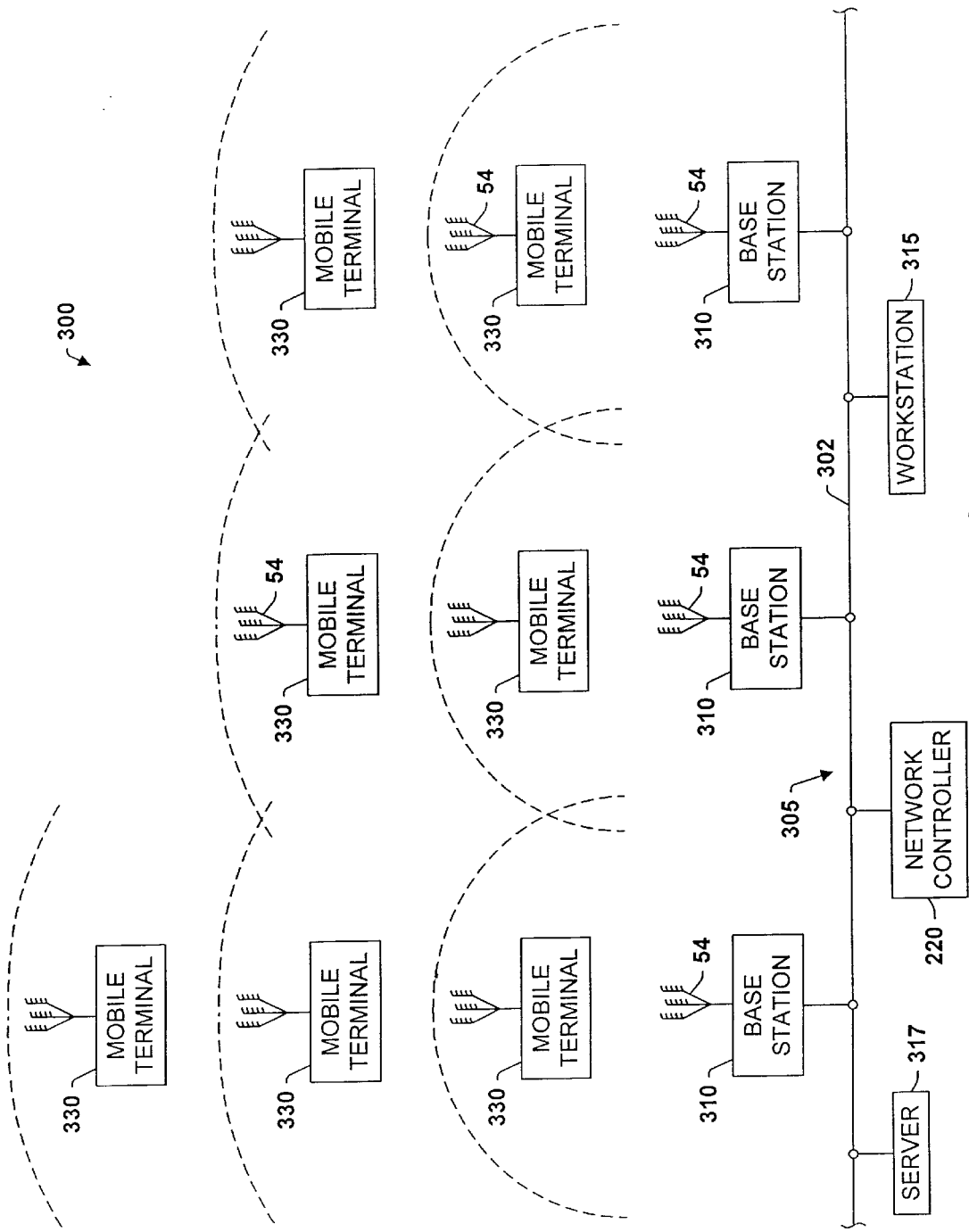
FIG. 14 is a block diagram of a cellular communication system in accordance with the present invention.

For at least the reasons presented above, the SPM modulation technique of the present invention makes it possible to produce a cost effective communication system which employs both FH techniques and DS techniques FIG. 14 illustrates an exemplary cellular communication system 300 which utilizes the above-described SPM technique and hybrid transceiver design. As is discussed below in more detail in relation to FIGS. 15 and 16, the devices within the system 300 employ SPM in combination with DS and FH techniques in order to transmit and receive communications within the system. The cellular communication system 300 itself may be any of several known types including a local area network (LAN) or a wide area network (WAN).

The cellular communication system 300 in the exemplary embodiment includes a network 302 which forms a hardwired data communication path. The hardwired data communication path may be made of a twisted pair cable, shielded coaxial cable or fiber optic lines, for instance, and is often referred to generally as the system backbone 305. Connected to the system backbone 305 are base stations 310. Each base station 310 wirelessly communicates with other devices a given cell within the system 300 via an antenna 54.

The system 300 may also include a client/server network coupled to the system backbone 305, the client/server network including a work station (client) 315, such as an IBM compatible personal computer, and a server 317, such as an IBM RS/6000. A network controller 320 may also be wired to the system backbone 305 to control the flow of data between the base station 310 and other devices wired to the system backbone 305. The network controller 320 may communicate with the devices wired to the system backbone 305 using a variety of protocols, such as the Ethernet or Token Ring protocol.

The cellular communication system 300 also includes one or more mobile terminals 330 operating in accordance with the present invention and roaming from cell to cell using a registration and deregistration process to assure a single entry point to the backbone. Such a registration and deregistration process is described in U.S. Pat. No. 5,276,680 assigned to Telesystems SLW of Ontario, Canada. The mobile terminals 330 may be hand held or vehicle mounted data capturing units, for example. As is conventional in many cellular communication systems, the base stations 310 and mobile units 330 each have an RF transceiver included therein for receiving and transmitting packets of digital data. In the present invention, however, the RF transceiver preferably in most or all of the devices embodies the use of SPM and preferably is combined with DS and FH spreading techniques as discussed above.

Figure 15:
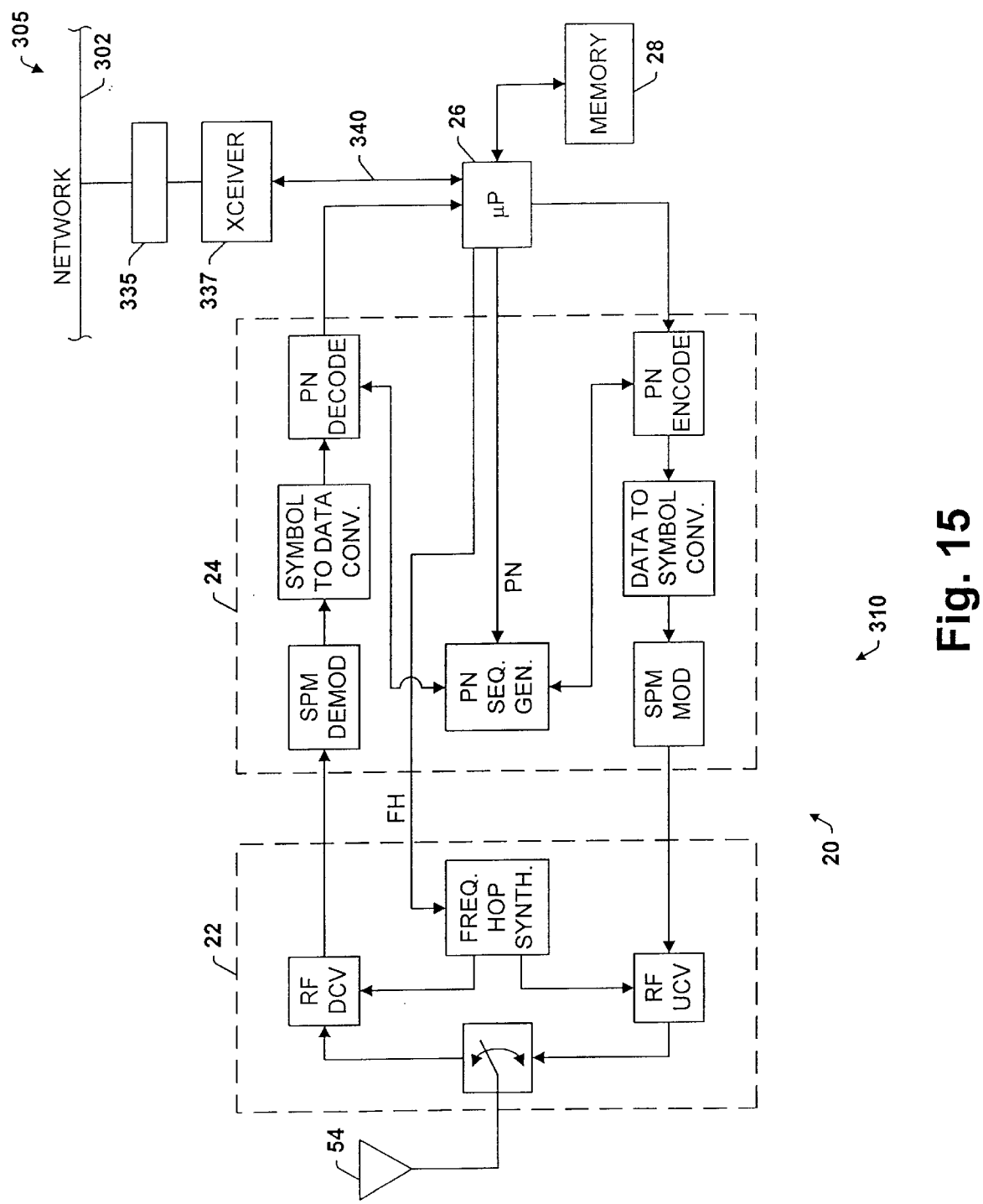
FIGS. 15 and 16 are transceivers utilized in a base station and mobile unit, respectively, of a cellular communication system in accordance with the present invention.

For example, FIG. 15 shows a block diagram of a base station 310 in accordance with the present invention. In order to wirelessly transmit/receive packets of information to/from mobile terminals 330 or other base stations 310 within its respective cell, the base station 310 includes the transceiver 20 described above. The base station 310 is connected to the system backbone 305 via a connector 335. The connector 335 is connected to the backbone 305 at one end and to a network adapter transceiver 337 included in the base station 310 at the other end. The network adapter transceiver 337 is configured according to conventional network adapter transceiver techniques to allow the base station 310 to communicate over the network. The network adapter transceiver 337 is also connected to an internal bus 340 included within the base station 310 and is coupled to the microprocessor 26 which controls the operation of the base station 310. The microprocessor 26 may include any of a variety of different microprocessors, such as the Motorola 68360 or Intel 80386 microprocessors.

Figure 16:
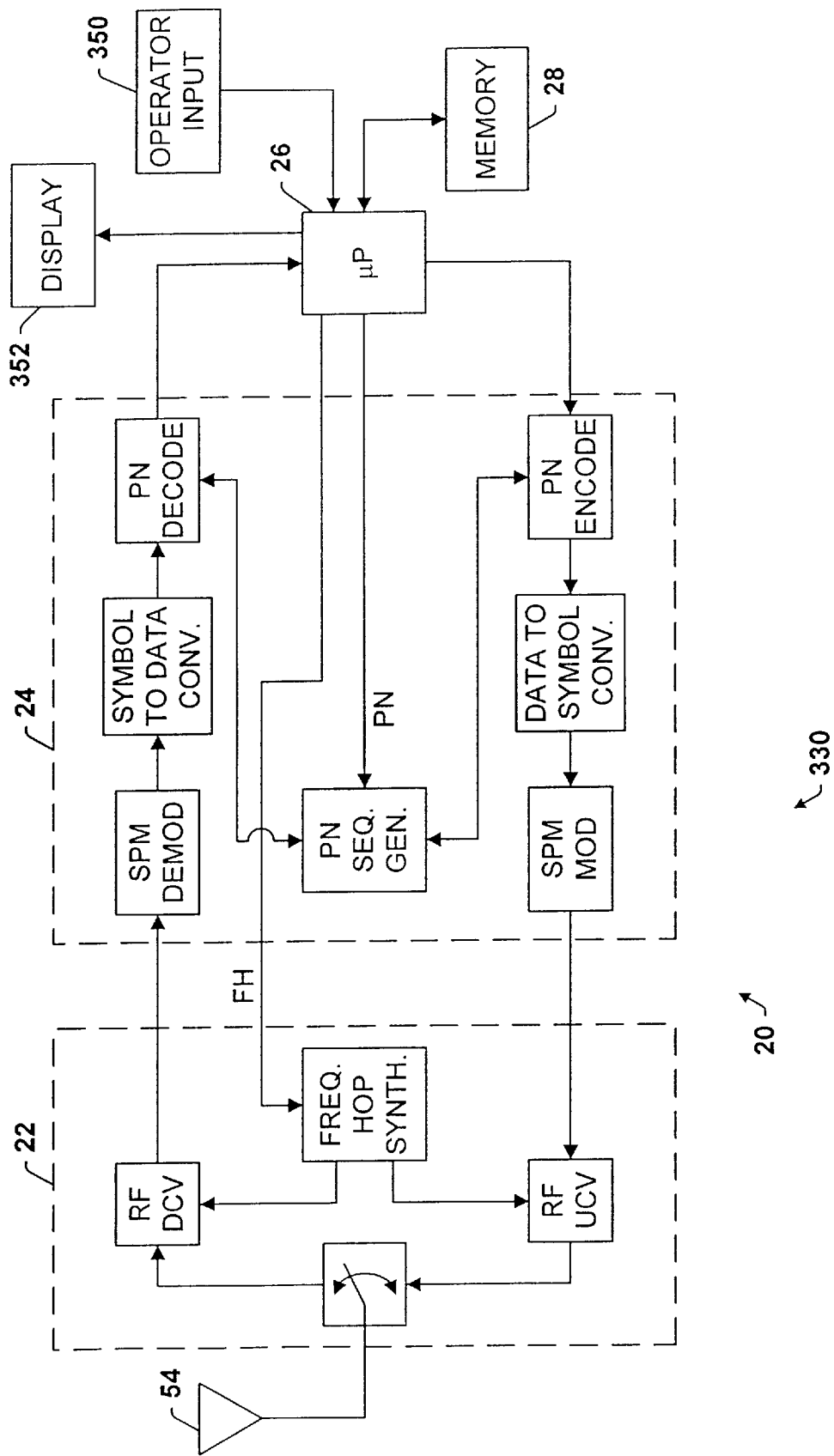

FIG. 16 presents a block diagram of an exemplary mobile terminal 330. The mobile terminal 330 also uses the transceiver 20 to wirelessly transmit and receive packets of information to/from devices within its cell. The mobile terminal 330 includes an operator input device 350 which allows an operator to input data to be communicated to the network such as inventory data, bar code information, etc. The input device 350 can include such items as a keypad, touch sensitive display, bar code scanner, etc. A display 352 is also connected to and controlled by the microprocessor 26. The display 352 serves as a means for displaying information stored within the mobile terminal and/or received over the network via a base station 310. The display 352 can be a flat panel liquid crystal display with alphanumeric capabilities, for example, or any other type of display as will be appreciated.

The hybrid transceiver 20 utilized in the base stations 310 and mobile terminals 330 allows for communications within the system 300 to be carried out using both FH and DS techniques in order to achieve the advantages of both. The high noise tolerance capabilities associated with FH spreading and the high data throughput capabilities of DS spreading are possible at relatively low cost. Because SPM modulation is carried out with sufficiently low side lobes on a constant amplitude waveform, there is no need for linear components as in other hybrid systems.

Generally speaking, the SPM modulation technique of the present invention could be used with a DS system, a FH system, a FH/DS hybrid system, as well as with other type systems regardless of whether spreading is performed. Unlike PSK and MSK modulation techniques, SPM is especially suited for use with a FH/DS hybrid system. SPM modulation provides minimum side lobes and is spectrally efficient as is critical for any FH system. Moreover, SPM modulation can be used to form a constant envelope waveform and allows for high data throughput ability as is important with DS systems.

Since the SPM modulation technique smoothly transitions from state to state, side bands produced during modulation are deminimus. Consequently, no amplitude varying signal needs to be added to the transmitted data to achieve spectral efficiency. Therefore non-linear parts (such as mixers and amplifiers) which are less expensive, less power consuming, and smaller in size can be used.

Although the invention has been shown and described with respect to certain preferred embodiments, it is obvious that equivalents and modifications will occur to others skilled in the art upon the reading and understanding of the specification. For example, the present invention is described using an I-Q constellation plane consisting of four discrete points or phase states (e.g., FIG. 2). Of course, the invention can be carried out with any number of discrete points or phase states such as two, eight, sixteen, thirty-two, etc. The signal waveforms for I and Q are calculated based on the particular transition between phase states in the same general manner presented above such that the phase changes at a rate which varies sinusoidally.

Furthermore, the above example provides for the transition period $T_{tran}$ to occur over 90% of the data or symbol period. However, other percentages could be used. Generally, the longer the transition period $T_{tran}$ the lower the resultant side lobe. In addition, although the time period $T_{fixed}$ is centered with respect to each symbol data in the above example, it will be appreciated that such time period could occur elsewhere without departing from the scope of the invention.

The transceiver 20 described above utilizes I and Q quadrature components for modulating a carrier signal. However, it will be appreciated that in another embodiment straight phase data can be provided from a memory or the like. The phase data is accessed during the transitions between data or symbols such that the phase data is used to provide a modulated carrier directly using conventional techniques. The data representing the phase during such transitions changes at a rate which varies sinusoidally. Such data can be represented, for example, by phase $\phi$ data of the type exemplified in Tables II–IV above. Furthermore, in the exemplary embodiment the PN encoding is performed on the data prior to the data-to-symbol conversion which then converts the PN encoded data to corresponding symbols. Alternatively, the data to be transmitted could first be converted to symbol data which is then spread according to a PN sequence whereby each symbol is converted into a plurality of chips represented by respective symbols as will be appreciated. Similarly, the PN decoding performed by the receiver would be based on the symbol data. The decoded symbol data would then be input to the symbol-to-data converter to obtain the received data. In either case, the SPM technique of the present invention still provides the same advantages.

Furthermore, the SPM technique as utilized in the exemplary embodiment involves the modulation of a carrier signal which is at an intermediate frequency within the system. The carrier signal at the intermediate frequency is then upconverted to the RF carrier frequency. However, it will be appreciated that the present invention has utility in the modulation of a carrier signal regardless of whether the carrier signal is at a carrier frequency or at some other intermediate or baseband frequency. Finally, the invention is described above primarily in the context of a transceiver. Nevertheless, SPM in accordance with the invention can be incorporated in a receiver or transmitter alone as will be appreciated.

The present invention includes all such equivalents and modifications, and is limited only by the scope of the following claims.

What is claimed is:

1. A method of transmitting data, comprising the step of:
producing a carrier signal which transitions in phase between predetermined phase states as a function of the data, wherein a rate at which the carrier signal changes phase during a transition between the predetermined phase states varies substantially sinusoidally.

2. The method of claim 1, wherein the rate at which the carrier signal changes phase at the beginning and end of the transition is equal to zero.

3. The method of claim 2, wherein the rate at which the carrier signal changes phase during the transition is defined by a sinewave from zero to π radians.

4. The method of claim 1, wherein the predetermined phase states are any of at least two phase states.

5. The method of claim 1, wherein the predetermined phase states are any of at least four phase states.

6. The method of claim 1, wherein the step of producing the carrier signal comprises the step of forming orthogonally phased I and Q components representing the data which, when combined with a carrier, produce the carrier signal having the rate which varies substantially sinusoidally.

7. The method of claim 1, wherein the carrier signal is a constant-amplitude waveform.

8. A transmitter for transmitting data, comprising:
   a circuit for producing a carrier signal which transitions in phase between predetermined phase states as a function of the data, wherein a rate at which the carrier signal changes phase during a transition between the predetermined phase states varies substantially sinusoidally; and
   a radio frequency circuit for transmitting the carrier signal.

9. The transmitter of claim 8, wherein the rate at which the carrier signal changes phase at the beginning and end of the transition is equal to zero.

10. The transmitter of claim 8, wherein the circuit for producing the carrier signal comprises circuitry for forming orthogonally phased I and Q components representing the data which, when combined with a carrier, produce the carrier signal having the rate which varies substantially sinusoidally.

11. The transmitter of claim 8, wherein the radio frequency circuit causes the carrier signal to hop in frequency.

12. The transmitter of claim 11, further comprising direct sequence spreading circuitry for spreading the data being transmitted according to a predetermined PN sequence.

13. The transmitter of claim 8, wherein the carrier signal is a constant-amplitude waveform.

14. A method of transmitting data, comprising the step of:
   producing a carrier signal which transitions in phase between predetermined phase states as a function of the data, wherein a rate at which the carrier signal changes phase during a transition between the predetermined phase states gradually increases from zero at a beginning of the transition and gradually decreases to zero at an end of the transition.

15. The method of claim 14, further comprising the step of direct sequence spreading the data being transmitted according to a predetermined PN sequence.

16. The method of claim 14, further comprising the steps of direct sequence spreading the data being transmitted according to a predetermined PN sequence, and sequentially hopping among different frequency channels while transmitting the data.

17. The method of claim 14, wherein the rate at which the carrier signal changes phase during the transition is defined by a sinewave from zero to π radians.

18. A transmitter for transmitting data, comprising:
   a circuit for producing a carrier signal which transitions in phase between predetermined phase states as a function of the data, wherein a rate at which the carrier signal changes phase during a transition between the predetermined phase states gradually increases from zero at a beginning of the transition and gradually decreases to zero at an end of the transition; and
   a radio frequency circuit for transmitting the carrier signal.

19. The transmitter of claim 18, wherein the rate at which the carrier signal changes phase during the transition is defined by a sinewave from zero to π radians.

20. A cellular communication system, comprising:
   a network;
   a host computer coupled to the network:
   a plurality of base stations coupled to the network and communicating with the host computer, each of the base stations comprising a base station transceiver for transmitting and receiving wireless communications; and
   a plurality of mobile terminals each for communicating with the network by way of at least one of the plurality of base stations, each of the plurality of mobile terminals having a mobile terminal transceiver for transmitting and receiving wireless communications with respect to the at least one of the plurality of base stations;
   wherein the transceiver of at least one of the mobile terminals or base stations comprises:
      a transmitter portion for transmitting data, the transmitter portion comprising:
         a circuit for producing a carrier signal which transitions in phase between predetermined phase states as a function of the data, wherein a rate at which the carrier signal changes phase during a transition between the predetermined phase states varies substantially sinusoidally; and
         a radio frequency circuit for transmitting the carrier signal.

21. The system of claim 20, wherein the rate at which the carrier signal changes phase during the transition is defined by a sinewave from zero to π radians.

22. The system of claim 20, wherein the radio frequency circuit causes the carrier signal to hop in frequency.

23. The system of claim 22, wherein the radio frequency circuit further comprises direct sequence spreading circuitry for spreading the data being transmitted according to a predetermined PN sequence.

24. The system of claim 20, wherein the carrier signal is a constant-amplitude waveform.

25. A radio for communicating in a spread spectrum communication system, said radio comprising:
   a spread spectrum receiver for receiving information; and
   a spread spectrum transmitter for transmitting information, said transmitter having a circuit for producing an RF signal which transitions in phase between predetermined phase states as a function of the information to be transmitted, wherein a rate at which the RF signal changes phase during a transition between the predetermined phase states varies substantially sinusoidally.

26. The radio of claim 25, wherein the transmitter further comprises direct sequence spreading circuitry for spreading the information being transmitted according to a predetermined PN sequence.

27. The radio of claim 25, wherein the transmitter further comprises circuitry for spreading the information to be transmitted according to a predetermined hop sequence.

28. The radio of claim 27, wherein the transmitter further comprises direct sequence spreading circuitry for spreading the information to be transmitted according to a predetermined spreading code.

* * * * *